United States Patent
Vernier et al.

(10) Patent No.: US 12,545,686 B2
(45) Date of Patent: Feb. 10, 2026

(54) POLYMORPHIC FORMS OF (S)-N-(3-BROMO-2-FLUOROPHENYL)-7-((4-METHYLPIPERAZIN-1-YL)METHYL)-7,8-DIHYDRO-[1,4]DIOXINO[2,3-G] QUINAZOLIN-4-AMINE AS EGFR INHIBITORS

(71) Applicant: ERASCA, INC., San Diego, CA (US)

(72) Inventors: Jean-Michel Vernier, San Diego, CA (US); Fritz Blatter, Reinach (CH); Axel Rainer Maier, Baden-Württemberg (DE); Nicolino Tufilli, Moehlin (CH)

(73) Assignee: KATMAI PHARMACEUTICALS, INC., Corona Del Mar, CA (US)

( * ) Notice: Subject to any disclaimer, the term of this patent is extended or adjusted under 35 U.S.C. 154(b) by 0 days.

(21) Appl. No.: 18/614,458

(22) Filed: Mar. 22, 2024

(65) Prior Publication Data

US 2024/0287088 A1 Aug. 29, 2024

Related U.S. Application Data

(63) Continuation of application No. PCT/US2022/044475, filed on Sep. 23, 2022.

(60) Provisional application No. 63/247,774, filed on Sep. 23, 2021.

(51) Int. Cl.
A61K 31/519 (2006.01)
A61K 31/517 (2006.01)
C07D 487/04 (2006.01)
C07D 491/056 (2006.01)

(52) U.S. Cl.
CPC ........ C07D 491/056 (2013.01); A61K 31/517 (2013.01)

(58) Field of Classification Search
CPC .............. C07D 491/056; C07D 487/04; A61K 31/517; A61K 31/519
USPC .......................................... 514/267; 544/250
See application file for complete search history.

(56) References Cited

U.S. PATENT DOCUMENTS

| | | | |
|---|---|---|---|
| 5,580,870 A | 12/1996 | Barker et al. | |
| 5,747,498 A | 5/1998 | Schnur et al. | |
| 6,835,735 B2 | 12/2004 | Lee et al. | |
| 7,521,456 B2 | 4/2009 | Allen et al. | |
| 8,344,139 B2 | 1/2013 | Moser et al. | |
| 8,916,574 B2 | 12/2014 | Wang et al. | |
| 11,377,451 B2 | 7/2022 | Nathanson et al. | |
| 2003/0045537 A1 | 3/2003 | Lee et al. | |
| 2005/0165009 A1 | 7/2005 | Ishiuchi | |
| 2007/0141066 A1 | 6/2007 | Phillips et al. | |
| 2018/0221479 A1 | 8/2018 | Osswald et al. | |
| 2020/0290978 A1 | 9/2020 | Nathanson et al. | |
| 2022/0064177 A1 | 3/2022 | Nathanson et al. | |
| 2023/0115366 A1 | 4/2023 | Nathanson et al. | |
| 2023/0358726 A1 | 11/2023 | Nathanson et al. | |
| 2023/0364091 A1 | 11/2023 | Nathanson et al. | |
| 2024/0043390 A1 | 2/2024 | Nathanson et al. | |
| 2024/0058340 A1 | 2/2024 | Vernier et al. | |

FOREIGN PATENT DOCUMENTS

| | | |
|---|---|---|
| BR | PI1003128 A2 | 4/2012 |
| CL | 200102066 A1 | 5/2002 |
| CN | 1854130 A | 11/2006 |
| CN | 101594870 A | 12/2009 |
| CN | 102030742 A | 4/2011 |
| CN | 103965211 A | 8/2014 |
| CN | 103965212 A | 8/2014 |
| CN | 103965213 A | 8/2014 |
| CN | 105017163 A | 11/2015 |
| CN | 106432202 A | 2/2017 |
| GB | 2033894 A | 5/1980 |
| JP | H06336481 A | 12/1994 |
| JP | H10505600 A | 6/1998 |
| JP | H10506633 A | 6/1998 |
| JP | H11508906 A | 8/1999 |
| JP | 2000512990 A | 10/2000 |
| JP | 2003026682 A | 1/2003 |
| JP | 2008308491 A | 12/2008 |
| WO | 9609294 A1 | 3/1996 |
| WO | 9630347 A1 | 10/1996 |
| WO | 9703069 A1 | 1/1997 |

(Continued)

OTHER PUBLICATIONS

International Search Report and Written Opinion received in PCT Application No. PCT/US2023/035237, mailed on Dec. 27, 2023, 10 pages.

(Continued)

*Primary Examiner* — Douglas M Willis
(74) *Attorney, Agent, or Firm* — Mintz, Levin, Cohn, Ferris, Glovsky and Popeo, P.C.

(57) ABSTRACT

The present disclosure relates to polymorph forms of (S)—N-(3-bromo-2-fluorophenyl)-7-((4-methylpiperazin-1-yl) methyl)-7,8-dihydro-[1,4]dioxino[2,3-g]quinazolin-4-amine (compound (I)), methods of preparation and use thereof as EGFR inhibitor:

Compound (I)

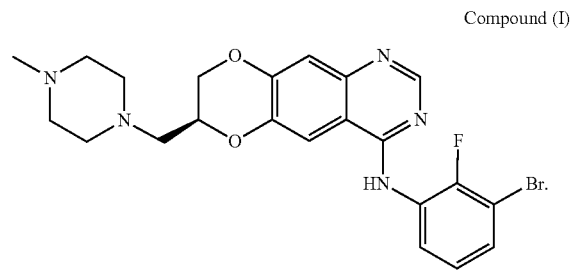

13 Claims, 6 Drawing Sheets

(56) References Cited

FOREIGN PATENT DOCUMENTS

| WO | 9749688 | A1 | 12/1997 | |
|---|---|---|---|---|
| WO | 2004072040 | A1 | 8/2004 | |
| WO | 2008024439 | A2 | 2/2008 | |
| WO | 2008046242 | A1 | 4/2008 | |
| WO | 2010045344 | A1 | 4/2010 | |
| WO | 2011056740 | A1 | 5/2011 | |
| WO | 2012127012 | A1 | 9/2012 | |
| WO | 2013013614 | A1 | 1/2013 | |
| WO | 2014161808 | A1 | 10/2014 | |
| WO | 2016100347 | A2 | 6/2016 | |
| WO | 2016123706 | A1 | 8/2016 | |
| WO | 2017117680 | A1 | 7/2017 | |
| WO | 2019067543 | A1 | 4/2019 | |
| WO | WO-2020190765 | A2 * | 9/2020 | ........... A61K 31/519 |
| WO | 2022061201 | A1 | 3/2022 | |
| WO | 2022061202 | A1 | 3/2022 | |
| WO | 2022061299 | A1 | 3/2022 | |
| WO | 2023049312 | A1 | 3/2023 | |
| WO | 2023244639 | A1 | 12/2023 | |
| WO | 2024081447 | A1 | 4/2024 | |
| WO | 2024102177 | A1 | 5/2024 | |

OTHER PUBLICATIONS

18F-FDG PET and Osimertinib in Evaluating Glucose Utilization in Patients with EGFR Activated Recurrent Glioblastoma. *Clinical Trials* Feb. 26, 2019, 13 pages.
CAS Registry No. 1207868-28-7, Mar. 4, 2010, 1 page.
CAS Registry No. 1348957-85-6, Dec. 5, 2011, 1 page.
CAS Registry No. 1348971-95-8, Dec. 5, 2011, 1 page.
CAS Registry No. 1348975-63-2, Dec. 5, 2011, 1 page.
CAS Registry No. 1349202-84-1, Dec. 5, 2011, 1 page.
CAS Registry No. 1349618-58-1, Dec. 6, 2011, 1 page.
CAS Registry No. 886446-50-0, Jun. 1, 2006, 1 page.
CAS Registry No. 886446-54-4, Jun. 1, 2006, 1 page.
CAS Registry No. 886446-55-5, Jun. 1, 2006, 1 page.
CAS Registry No. 886446-56-6, Jun. 1, 2006, 1 page.
CAS Registry No. 886446-57-7, Jun. 1, 2006, 1 page.
CAS Registry No. 886446-58-8, Jun. 1, 2006, 1 page.
CAS Registry No. 886446-73-7, Jun. 1, 2006, 1 page.
Extended European Search Report Received for EP Application No. 18860554.7, mailed on Mar. 3, 2021, 6 pages.
Extended European Search Report Received for EP Application No. 20773177.9, mailed on Nov. 25, 2022, 6 pages.
International Preliminary Report on Patentability Received for PCT Patent Application No. PCT/US2018/052858, mailed on Apr. 9, 2020, 15 pages.
International Preliminary Report on Patentability Received for PCT Patent Application No. PCT/US2020/022743, mailed on Sep. 30, 2021, 13 pages.
International Search Report and Written Opinion Received for PCT Patent Application No. PCT/US2020/022743, mailed on Oct. 22, 2020, 13 pages.
International Search Report and Written Opinion Received for PCT Patent Application No. PCT/US2021/051023, mailed on Dec. 21, 2021, 13 pages.
International Search Report and Written Opinion Received for PCT Patent Application No. PCT/US2021/051024, mailed on Dec. 14, 2021, 12 pages.
International Search Report and Written Opinion Received for PCT Patent Application No. PCT/US2021/051338, mailed on Nov. 24, 2021, 14 pages.
International Search Report and Written Opinion Received for PCT Patent Application No. PCT/US2022/044475, mailed on Jan. 19, 2023, 16 pages.
International Search Report and Written Opinion Received for PCT Patent Application No. PCT/US2023/025255, mailed on Oct. 8, 2023, 10 pages.
International Search Report and Written Opinion Received for PCT Patent Application No. PCT/US2023/028646, mailed on Sep. 26, 2023, 16 pages.
International Search Report and Written Opinion Received for PCT Patent Application No. PCT/US2018/052858, mailed on Jan. 15, 2019, 24 pages.
Abida; Parvez, N.; Rana, A.; Imran, M. An Updated Review: Newer Quinazoline Derivatives Under Clinical Trial. *Intl. J. Pharm. & Bio. Arch.* 2011, 2 (6), 1651-1657.
Asif, M. Chemical Characteristics, Synthetic Methods, and Biological Potential of Quinazoline and Quinazolinone Derivatives. *Intl. J. Med. Chem.* Article ID 395637, Nov. 13, 2014, 27 pages.
Assefa, H.; Kamath, S.; Buolamwini, J.K. 3D-QSAR And Docking Studies On 4-Anilinoquinazoline And 4-Anilinoquinoline Epidermal Growth Factor Receptor (EGFR) Tyrosine Kinase Inhibitors. *J. Comp-Aided Molecular Design* 2003, 17, 475-493.
Burris III, H.A. Dual Kinase Inhibition in the Treatment of Breast Cancer: Initial Experience with the EGFR/ErbB-2 Inhibitor Lapatinib. *The Oncologist* 2004, 9 (Suppl 3), 10-15.
Cabeça, L.F.; Rocco, S.A.; Oliveira, P.R.; Rittner, R. Synthesis of some 4-N-(Phenylamino)-6,7-methylenedioxyquinazoline derivatives. *Trends in Org. Chem.*, 2008, 12, 47-52.
Chen, G.; Luo, X.; Zhu, W.; Luo, C.; Liu, H.; Puah, C.M.; Chen, K.; Jiang, H. Elucidating inhibitory models of the inhibitors of epidermal growth factor receptor by docking and 3D-QSAR. *Bio. & Med. Chem.* May 1, 2004, 12 (9), 2409-2417.
Chen, L.; Zhang, Y.; Liu, J.; Wang, W.; Li, X.; Zhao, L.; Wang, W.; Li, B. Novel 4-arylaminoquinazoline Derivatives With (E)-propen-1-yl Moiety as Potent EGFR Inhibitors with Enhanced Antiproliferative Activities Against Tumor Cells. *Eur. J. Med. Chem.* Sep. 29, 2017, 138, 689-697.
Chilin, A.; Conconi, M.T.; Marzaro, G.; Guiotto, A.; Urbani, L.; Tonus, F.; Parnigotto, P. Exploring Epidermal Growth Factor Receptor (EGFR) Inhibitor Features: The Role of Fused Dioxygenated Rings on The Quinazoline Scaffold. *J. Med. Chem.* 2010, 53, 1862-1866.
Clark, P.M.; Mai, W.X.; Cloughesy, T.F.; Nathanson, D.A. Emerging Approaches for Targeting Metabolic Vulnerabilities in Malignant Glioma. *Curr Neurol and Neurosci Rep* Jan. 12, 2016, 16 (7), 10 pages.
Conconi, M.T.; Marzaro, G.; Urbani, L.; Zanusso, I.; Liddo, R.D.; Castagliuolo, I.; Brun, P.; Tonus, F.; Ferrarese, A.; Guiotto, A.; Chilin, A. Quinazoline-based Multi-tyrosine Kinase Inhibitors: Synthesis, Modeling, Antitumor and Antiangiogenic Properties. *Eur. J. Med. Chem.* Sep. 2013, 67, 373-383.
Desiniotis, A.; Kyprianou, N. Advances in the Design and Synthesis of Prazosin Derivatives over the Last Ten Years *Expert Opin Ther Targets* Dec. 2011, 15 (12), 1405-1418.
Elbert, B.L.; Farley, A.J.M.; Gorman, T.W.; Johnson, T.C.; Genicot, C.; Lallemand, B., Pasau, P., Flasz, J.; Castro, J.L.; MacCoss, M.; Paton, R.S.; Schofield, C.J.; Smith, M.D.; Willis, M.C.; Dixon, D.J. C—H Cyanation of 6-Ring N-Containing Heteroaromatics. *Chem. Eur. J.* 2017, 23, 14733-14737.
Ellingson, B.M.; Yao, J.; Raymond, C.; Nathanson, D.A.; Chakhoyan, A.; Simpson, J.; Garner, J.; Olivero, A.; Mueller, L.; Rodon, J.; Gerstner, E.R.; Cloughesy, T.F., Wen, P.Y. Multiparametric MR-PET Imaging Predicts Pharmacokinetics and Clinical Response to GDC-0084 in Patients with Recurrent High-Grade Glioma. *Clin. Cancer Res.* Jul. 1, 2020, 26 (13), 3135-3144.
Erasca Announces Four Poster Presentations at the Upcoming 34th EORTC-NCI-AACR Symposium. *ERASCA Presentation.* Oct. 12, 2022, 3 pages.
Garofalo, A.; Goossens, L.; Six, P.; Lebegue, N.; Depreux, P. ChemInform Abstract: Novel and Efficient One-Pot Synthesis of (Aminophenyl)carbamic Acid Esters. *Synthetic Comm.* Jul. 2011, 41 (13), 2007-2016.
Garofalo, A.; Goossens, L.; Baldeyrou, B.; Lemoine, A.; Ravez S.; Six, P.; David-Cordonnier, M.-H.; Bonte, J.-P.; Depreux, P.; Lansiaux, A.; Goossens, J.- F. Design, Synthesis, and DNA-Binding of N-Alkyl(anilino)quinazoline Derivatives. *J. Med. Chem.* 2010, 53, 8089-8103.
Georgiou, A.; Stewart, A., Cunningham, D.; Banerji, U.; Whittaker, S.R. Inactivation of NF1 promotes resistance to EGFR inhibition in

(56) References Cited

OTHER PUBLICATIONS

KRAS/NRAS/BRAFV600-wildtype colorectal cancer. *Mol Cancer Res.* Jun. 1, 2020, 18 (6), 835-846.

Ghosh, M.K.; Sharma, P.; Harbor P.C.; Rahaman, S.O.; Haque, S.J. PI3K-AKT pathway negatively controls EGFR-dependent DNA-binding activity of Stat3 in glioblastoma multiforme cells. *Oncogene* 2005, 24, 7290-7300.

Giannopoulou, E.; Dimitropoulos, K.; Argyriou, A.A.; Koutras, A.K.; Dimitrakopoulos, F.; Kalofonos, H.P. An in vitro study, evaluating the effect of sunitinib and/or lapatinib on two glioma cell lines. *Invest New Drugs* 2010, 28, 554-560.

Goldenberg, J.M.; Pagel, M.D. Assessments of tumor metabolism with CEST MRI. *NMR Biomed.* Oct. 2019, 32 (10), e3943, 23 pages.

Gupta, S.; Misra, G.; Pant, M.C.; Seth, P.K. Targeting the Epidermal Growth Factor Receptor: Exploring the Potential of Novel Inhibitor N-(3-Ethynylphenyl)-6, 7-bis (2-methoxyethoxy) Quinolin-4-Amine Using Docking and Molecular Dynamics Simulation. *Protein and Peptide Letters* 2012, 19 (9), 14 pages.

Ha, J.-D.; Kang, S.-K.; Kim, K.-D.; Choi, J.-K.; Kong, J.-Y.; Ahn, C.-H. Design and Synthesis of Novel Epidermal Growth Factor Receptor Kinase Inhibitors. *Bull. Korean Chem. Soc.* 2005, 26 (6), 959-965.

Haghighijoo, Z.; Rezaei, Z.; Taheri, S.; Jani, M.; Khabnadideh, S. A rapid and convenient method for synthesis of anilinoquinazoline: an improved synthesis of erlotinib derivatives. *Trends in Pharm. Sci.* 2015, 1 (3), 173-178.

Harris, C.S.; Hennequin, L.F.; Kettle, J.G.; Willerval, O.A. Selective alkylation of a 6,7-dihydroxyquinazoline. *Tetrahedron Letters* 2005, 46, 7715-7719.

Hennequin, L.F.; Stokes, E.S.E.; Thomas, A.P.; Johnstone, C.; Ple, P.A.; Ogilvie, D.J.; Dukes, M.; Wedge, S.R.; Kendrew, J.; Curwen, J.O. Novel 4-Anilinoquinazolines with C-7 Basic Side Chains: Design and Structure Activity Relationship of a Series of Potent, Orally Active, VEGF Receptor Tyrosine Kinase Inhibitors. *J. Med. Chem.* 2002, 45, 1300-1312.

Ishiuchi, S. New roles of glutamate receptors in glias and gliomas. *Brain Nerve* Jul. 2009, 61 (7), 753-764. (1 page of Abstract only).

Jafari, E.; Khajouei, M.R.; Hassanzadeh, F.; Hakimelahi, G.H.; Khodarahmi, G.A. Quinazolinone and quinazoline derivatives: recent structures with potent antimicrobial and cytotoxic activities. *Res. in Phar. Sci.* Feb. 2016, 11 (1), 1-14.

Lee, J.Y.; Park, Y.K.; Seo, S.H.; So, I.- S.; Chung, H.-K.; Yang, B.-S.; Lee, S.J.; Park, H.; Lee, Y.S. 1,4-Dioxane-fused 4-anilinoquinazoline as Inhibitors of Epidermal Growth Factor Receptor Kinase. *Arch. Pharm. Pharm. Med. Chem.* 2001, 334, 357-360.

Lee, J.Y.; Park, Y.K.; Seo, S.H.; Yang, B.-S.; Park, H.; Lee, Y.S. 7-Substituted-[1, 4]dioxano[2, 3-g]quinazolines as Inhibitors of Epidermal Growth Factor Receptor Kinase. *Arch. Pharm. Pharm. Med. Chem.* 2002, 335 (10) 487-494.

Lopez-Gines, C.; Cerda-Nicolas, M.; Gil-Benso, R.; Pellin, A.; Lopez-Guerrero, J.A.; Callaghan, R.; Benito, R.; Roldan, P.; Piquer, J.; Llacer, J.; Barbera, J. Association of Chromosome 7, Chromosome 10 and EGFR Gene Amplification in Glioblastoma Multiforme. *Clin Neuropathol.* Sep.-Oct. 2005, 24 (5), 209-218.

Mai, W. X.; Gosa, L.; Daniels, V. W.; Ta, L.; Tsang, J. E.; Higgins, B.; Gilmore, W. B.; Bayley, N. A.; Harati, M. D..; Lee, J. T.; Yong, W. H.; Kornblum, H. I.; Bensinger, S. J.; Mischel, P. S.; Rao, P. N.; Clark, P. M.; Cloughesy, T. F.; Letai, A.; Nathanson, D. A. Cytoplasmic p53 couples oncogene-driven glucose metabolism to apoptosis and is a therapeutic target in glioblastoma. *Nat Med.* Nov. 2017, 23 (11), 1342-1351.

Marzaro, G.; Coluccia, A.; Ferrarese, A.; Brun, P.; Castagliuolo, I.; Conconi, M.T.; La Regina, G.; Bai, R.; Silvestri, R.; Hamel, E.; Chilin, A. Discovery of biarylaminoquinazolines as novel tubulin polymerization inhibitors. *J Med Chem.* Jun. 12, 2014, 57 (11), 4598-4605.

Moutal, A.; Villa, L.S.; Yeon, S.K.; Householder, K.T.; Park, K.D.; Sirianni, R.W.; Khanna, R. CRMP2 Phosphorylation Drives Glioblastoma Cell Proliferation. *Mol Neurobiol.* May 2018, 55 (5), 4403-4416.

Narla, R.K.; Liu, X.P.; Myers, D.E.; Uckun, F.M. 4-(3'-Bromo-4'hydroxylphenyl)-amino-6,7-dimethoxyquinazoline: a novel quinazoline derivative with potent cytotoxic activity against human glioblastoma cells. *Clin Cancer Res.* Jun. 1998, 4 (6), 1405-1414.

Narla, R.K.; Liu, X.P.; Klis, D.; Uckun, F.M. Inhibition of human glioblastoma cell adhesion and invasion by 4-(4'-hydroxylphenyl)-amino-6,7-dimethoxyquinazoline (WHI-P131) and 4-(3'-bromo-4'-hydroxylphenyl)-amino-6,7-dimethoxyquinazoline (WHI-P154). *Clin Cancer Res.* Oct. 1998, 4 (10), 2463-2471.

Nathanson, D. Mechanisms of evading targeted treatments in GBM: Functional diagnostics to predict outcome to targeted therapy. *Department of Molecular & Medical Pharmacology Society of Neuro-Oncology Sunrise Session*, Nov. 23, 2019, 28 pages.

Nathanson, D. Therapeutic Resistance and Brain Cancer Neuroscience. *UCLA Cancer Neuroscience Seminar Series*, Jul. 28, 2022, 62 pages.

Ryan, A. J.; Wedge, S. R. ZD6474—a novel inhibitor of VEGFR and EGFR tyrosine kinase activity. *Br J. Cancer*, 2005, 92 (Suppl 1), S6-S13.

Sakka, O. K.; Fleita, D.; Mohare, R. M. Discovery of novel EGFR inhibitors: In silico study and 3D-pharmacophore model generation. *J. Computational Methods in Molecular Design*, 2013, 3 (2), 10-25.

Shen, J.; Zheng, H.; Ruan, J.; Fang, W.; Li, A.; Tian, G.; Niu, X.; Luo, S.; Zhao, P. Autophagy inhibition induces enhanced proapoptotic effects of ZD6474 in glioblastoma. *Br J Cancer.* Jul. 9, 2013, 109 (1), 164-171.

Shi, H.; Lai, B.; Chen, S.; Zhou, X.; Nie, J.; Ma, J.-A. Facile Synthesis of Novel Perfluorocarbon-Modulated 4-Anilinoquinazoline Analogues. *Chinese Journal of Chemistry.* 2017, 35 (11), 1693-1700.

Tsang, J.; Urner, L.; Tse, C.; Baufeld, L.; Faull, K.; Clark, P.; Cloughesy, T.; Jung, M.; Nathanson, D. DDIS-17. Development of Brain-Penetrant EGFR Inhibitors for CNS Malignancies. *Neuro Oncol.* Nov. 2019, 21(Suppl 6):vi66. (1 page).

Tsang, J. E.; Urner, L. M.; Kim, G.; Chow, K.; Baufeld, L.; Faull, K.; Cloughesy, T. F.; Clark, P.M.; Jung, M. E.; Nathanson, D. A. Development of a Potent Brain-Penetrant EGFR Tyrosine Kinase Inhibitor against Malignant Brain Tumors. *ACS Medicinal Chemistry Letters*, 2020, 11 (10), 1799-1809.

Wan, B.; Wu, Z.; Zhang, X.; Huang, B. Mefloquine as a dual inhibitor of glioblastoma angiogenesis and glioblastoma via disrupting lysosomal function. *Biochem Biophys Res Commun.* Nov. 26, 2021, 580, 7-13.

Wang, G.; Wang, J.; Zhao, H.; Wang, J.; Tony, T.S.S. The role of Myc and let-7a in glioblastoma, glucose metabolism and response to therapy. *Arch Biochem Biophys.* Aug. 15, 2015, 580, 84-92.

Wedge, S.R .; Ogilvie, D.J .; Dukes, M .; Kendrew, J .; Curwen, J.O .; Hennequin, L.F .; Thomas, A.P .; Stokes, E.S .; Curry, B .; Richmond, G.H .; Wadsworth, P.F .; ZD4190: an orally active inhibitor of vascular endothelial growth factor signaling with broad-spectrum antitumor efficacy. *Cancer Res.* Feb. 15, 2000, 60 (4), 970-975.

Xu C.-I.; Guo Z.-X.; Zhang, Y.-D.; Zho, F.-K.; Xu, G.-J.; Yu, Y.-P. Synthesis and Bioactivity of 6,7-Dimethoxy-Quinazoline-4-Arylamine Derivatives. *Chinese Pharmaceutical Journal*, 2007, 42 (22), 1748-1752.

Zeng, Q.; Wang, J.; Cheng, Z.; Chen, K.; Johnström, P.; Varnäs, K.; Li, D.Y.; Yang, Z.F.; Zhang, X. Discovery and Evaluation of Clinical Candidate AZD3759, a Potent, Oral Active, Central Nervous System-Penetrant, Epidermal Growth Factor Receptor Tyrosine Kinase Inhibitor. *J Med Chem.* Oct. 22, 2015, 58 (20), 8200-8215.

Zhu, X.F.; Liu, Z.C.; Xie, B.F.; Li, Z.M.; Feng, G.K.; Yang, D.; Zeng, Y.X. EGFR tyrosine kinase inhibitor AG1478 inhibits cell proliferation and arrests cell cycle in nasopharyngeal carcinoma cells. *Cancer Lett.* Aug. 10, 2001, 169 (1), 27-32.

(56) References Cited

OTHER PUBLICATIONS

Mino R. Caira; "Crystalline Polymorphism of Organic Compounds"; Topics In Current Chemistry; Jan. 1, 1998; 198:163-208.

* cited by examiner

POLYMORPHIC FORMS OF (S)-N-(3-BROMO-2-FLUOROPHENYL)-7-((4-METHYLPIPERAZIN-1-YL)METHYL)-7,8-DIHYDRO-[1,4]DIOXINO[2,3-G]QUINAZOLIN-4-AMINE AS EGFR INHIBITORS

CROSS-REFERENCE TO RELATED APPLICATIONS

This application is a continuation of a national stage application under 35 U.S.C. § 371, of International Patent Application No. PCT/US2022/44475, filed on Sep. 23, 2022, which claims priority to U.S. Provisional Patent Application No. 63/247,774, filed Sep. 23, 2021, the disclosures of which are incorporated by reference herein in their entirety.

BACKGROUND

Glioblastoma (glioblastoma multiforme; GBM) accounts for the majority of primary malignant brain tumors in adults. Amplification and mutation of the epidermal growth factor receptor (EGFR) gene is a signature genetic abnormality encountered in GBM (Sugawa, et al. (1990) Proc. Natl. Acad. Sci. 87: 8602-8606; Ekstrand, et al. (1992) Proc. Natl. Acad. Sci. 89: 4309-4313). A range of potential therapies that target EGFR or its mutant constitutively active form, AEGFR, including tyrosine kinase inhibitors (TKIs), monoclonal antibodies, vaccines, and RNA-based agents, are currently in development or in clinical trials for the treatment of GBM. However, to date their efficacy in the clinic has so far been limited by both upfront and acquired drug resistance (Taylor, et al. (2012) Curr. Cancer Drug Targets. 12: 197-209). A major limitation is that current therapies such as erlotinib, lapatinib, gefitinib and afatinib are poorly brain penetrant (Razier, et al. (2010) Neuro-Oncology 12:95-103; Reardon, et al. (2015) Neuro-Oncology 17:430-439; Thiessen, et al. (2010) Cancer Chemother. Pharmacol. 65:353-361).

International Publication No. WO 2020/190765 disclosed (S)—N-(3-bromo-2-fluorophenyl)-7-((4-methylpiperazin-1-yl)methyl)-7,8-dihydro-[1,4]dioxino[2,3-g]quinazolin-4-amine ("Compound (I)"):

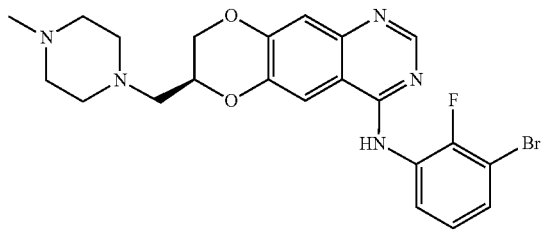

Compound (I)

which exhibited both good EGFR inhibitory activity and brain penetration capability. However, no polymorph forms were identified in this disclosure.

During drug development of an active pharmaceutical ingredient (API), the physical form of the API or a salt thereof can impact the physical properties of the drug candidate in the formulation. Many active pharmaceutical ingredients can exist in more than one polymorphic form. Moreover, a preferred form may also exist as a free base, free acid, or pharmaceutically acceptable salt. Therefore, the identification of pharmaceutically acceptable salt forms, as well as free base or free acid forms, for manufacturing represents an important step in the development of a drug candidate.

In deciding or identifying the preferred solid form, the preferred solid form is often one that possesses an unpredictable physical property. A particular solid form (crystalline, semi-solid) may be preferable because of ease of preparation, stability, etc. On the other hand, a different crystalline solid may be preferred for greater solubility and/or superior pharmacokinetics. Thus, while pharmaceutically acceptable salts of the active ingredient may provide increased solubility or increased solubility, the development of a particular pharmaceutical form, such as a crystalline solid, may be necessary to achieve a clinical pharmaceutical formulation.

SUMMARY

The present application is directed to polymorphs of (S)—N-(3-bromo-2-fluorophenyl)-7-((4-methylpiperazin-1-yl)methyl)-7,8-dihydro-[1,4]dioxino[2,3-g]quinazolin-4-amine.

In one aspect, embodiments herein relate to a polymorph form of Compound (I):

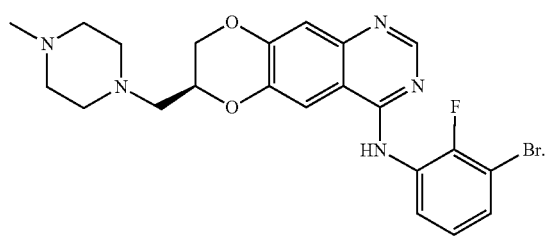

Compound (I)

In an embodiment, the polymorph form of Compound (I) is Form A and has an X-ray powder diffraction pattern with characteristic peaks expressed in values of degrees 2-theta at about 4.9±0.2, about 13.9±0.2, about 22.1±0.2, and about 25.1±0.2.

In an embodiment, the polymorph form of Compound (I) is Form B and has an X-ray powder diffraction pattern with characteristic peaks expressed in values of degrees 2-theta at about 4.8±0.2, about 9.8±0.2, about 13.8±0.2, about 14.7±0.2, about 17.7±0.2, about 20.2±0.2, about 24.1±0.2, about 24.6±0.2 and about 25.1±0.2.

In an embodiment, the polymorph form of Compound (I) is Form C and has an X-ray powder diffraction pattern with characteristic peaks expressed in values of degrees 2-theta at about 4.9±0.2, about 22.9±0.2, about 23.2±0.2, about 23.7±0.2 and about 24.3±0.2.

In an embodiment, the polymorph form of Compound (I) is Form D and has an X-ray powder diffraction pattern with characteristic peaks expressed in values of degrees 2-theta at about 15.6±0.2, about 16.9±0.2, about 19.1±0.2, about 19.5±0.2, about 22.5±0.2 and about 26.0±0.2.

In one aspect, embodiments herein relate to a method of purifying Compound (I):

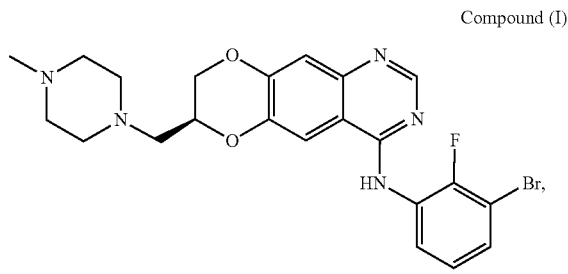 [SMILES: CN1CCN(C[C@H]2COc3cc4ncnc(Nc5cccc(Br)c5F)c4cc3O2)CC1]

Compound (I)

the method comprising preparing crystals of polymorph Form A and isolating the crystals of polymorph Form A.

In one aspect, embodiments herein relate to method of purifying Compound (I):

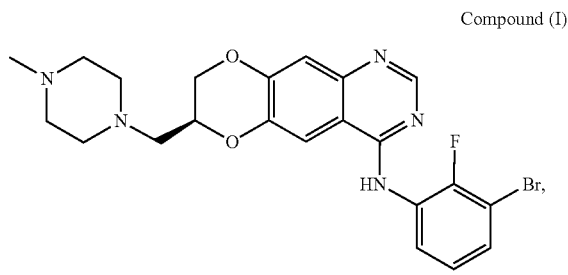 [SMILES: CN1CCN(C[C@H]2COc3cc4ncnc(Nc5cccc(Br)c5F)c4cc3O2)CC1]

Compound (I)

the method comprising preparing crystals of polymorph Form B and isolating the crystals of polymorph Form B.

In one aspect, embodiments herein relate to a method of purifying Compound (I):

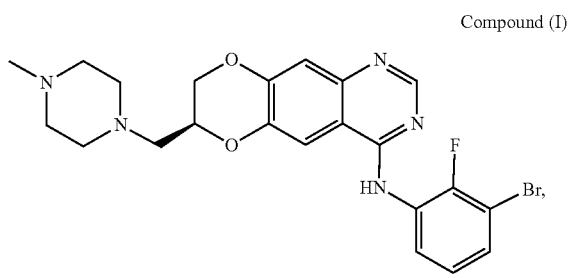 [SMILES: CN1CCN(C[C@H]2COc3cc4ncnc(Nc5cccc(Br)c5F)c4cc3O2)CC1]

Compound (I)

the method comprising preparing crystals of polymorph Form C and isolating the crystals of polymorph Form C.

In one aspect, embodiments herein relate to a method of purifying Compound (I):

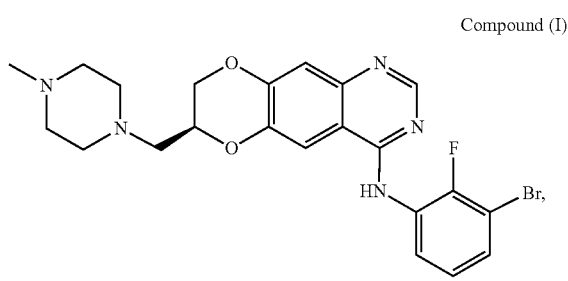 [SMILES: CN1CCN(C[C@H]2COc3cc4ncnc(Nc5cccc(Br)c5F)c4cc3O2)CC1]

Compound (I)

the method comprising preparing crystals of polymorph Form D and isolating the crystals of polymorph Form D.

In one aspect, embodiments herein relate to a pharmaceutical composition comprising a polymorph form of Compound (I), and a pharmaceutically acceptable excipient.

In one aspect, embodiments herein relate to method of treating a subject having cancer, the method comprising administering to the subject one or more polymorph forms A, B, C, or D of Compound (I).

In one aspect, embodiments herein relate to use of one or more polymorph forms A, B, C, or D of Compound (I) in the manufacture of a medicament for treating a subject having cancer.

DETAILED DESCRIPTION

Figure 1:
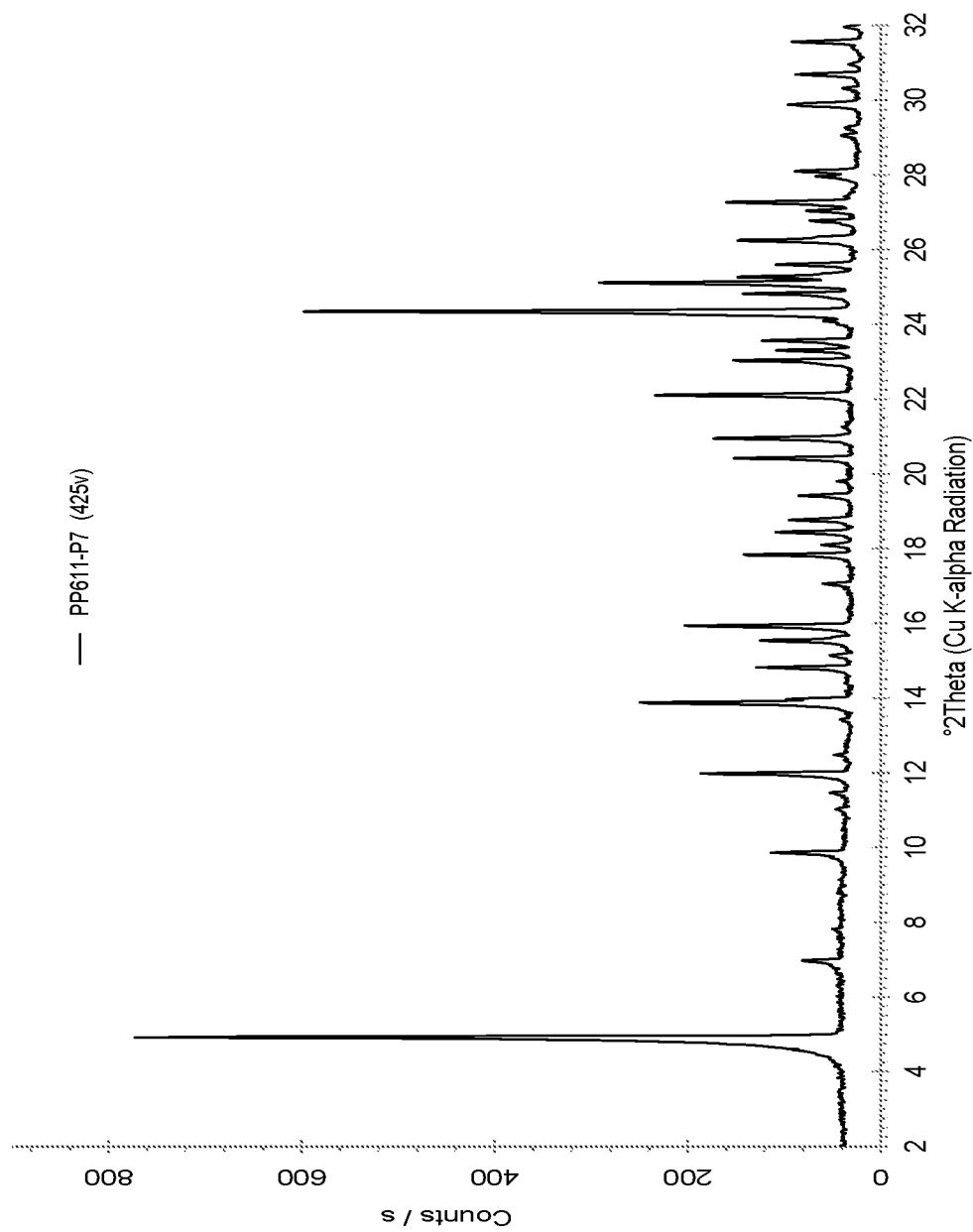
FIG. 1 shows a powder X-ray diffraction (PXRD) spectrum of crystalline Form A of Compound (I).

The present application is directed to polymorphs of (S)—N-(3-bromo-2-fluorophenyl)-7-((4-methylpiperazin-1-yl)methyl)-7,8-dihydro-[1,4]dioxino[2,3-g]quinazolin-4-amine.

The present disclosure may be understood more readily by reference to the following detailed description taken in connection with the accompanying figures and examples, which form a part of this disclosure. It is to be understood that disclosed embodiments are not limited to the specific devices, methods, applications, conditions or parameters described and/or shown herein, and that the terminology used herein is for the purpose of describing particular embodiments by way of example only and is not intended to be limiting of the disclosed embodiments. Also, as used in the specification including the appended claims, the singular forms "a," "an," and "the" include the plural, and reference to a particular numerical value includes at least that particular value, unless the context clearly dictates otherwise.

The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated compounds, which allows the presence of only the named compounds, along with any pharmaceutically carriers, and excludes other compounds.

Definitions

As used herein, and unless noted to the contrary, the following terms and phrases have the meaning noted below.

As used herein, the term "polymorph" refers to a crystal form of a compound. The term "polymorph" and "crystal form" or "Form" followed by an alphabet identifier are used interchangeably. Such crystal forms may be identified by, inter alia, X-ray diffraction patterns.

As used herein, "equilibrating," when used in reference to conditions for forming a polymorph of a compound, refers to a physical process that results in thermodynamic equilibrium.

As used herein, "suspension equilibrating," when used in reference to conditions for forming a polymorph of a compound, refers to a physical process that leads to a thermodynamic equilibrium in a suspension, which is typically solid particles/material dispersed in a liquid.

As used herein "slurrying," when used in reference to conditions for forming a polymorph of a compound, refers to physical process that leads to a thermodynamic equilibrium in a suspension, which is typically solid particles/material dispersed in a liquid, by stirring the suspension with a suitable stirring apparatus.

As used herein, "seeding," refers to the process of using a small quantity of an existing crystal form to aid in crystallization of more of that form from a solution or suspension of the compound of interest.

Unless otherwise indicated, all chiral (enantiomeric and diastereomeric) and racemic forms are within the scope of the disclosed embodiments. Many geometric isomers of C=C double bonds, C=N double bonds, ring systems, and the like can also be present in the compounds, and all such stable isomers are contemplated in the present disclosure. Cis- and trans-(or E- and Z-) geometric isomers of the compounds of the present disclosure are described and may be isolated as a mixture of isomers or as separated isomeric forms.

The term "stereoisomer" refers to isomers of identical constitution that differ in the arrangement of their atoms in space. Enantiomers and diastereomers are examples of stereoisomers. The term "enantiomer" refers to one of a pair of molecular species that are mirror images of each other and are not superimposable. The term "diastereomer" refers to stereoisomers that are not mirror images.

The symbols "R" and "S" represent the configuration of substituents around a chiral carbon atom(s). The isomeric descriptors "R" and "S" are used as described herein for indicating atom configuration(s) relative to a core molecule and are intended to be used as defined in the literature (IUPAC Recommendations 1996, *Pure and Applied Chemistry*, 68:2193-2222 (1996)).

Compounds of the present disclosure, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the disclosed embodiments.

All ranges disclosed herein are inclusive of the recited endpoint and independently combinable (for example, the range of "from 100 mg to 200 mg" is inclusive of the endpoints, 100 mg and 200 mg, and all the intermediate values). The endpoints of the ranges and any values disclosed herein are not limited to the precise range or value; they are sufficiently imprecise to include values approximating these ranges and/or values.

The term "API" refers to the active pharmaceutical ingredient. As used herein, API refers to "Compound (I)" or (S)—N-(3-bromo-2-fluorophenyl)-7-((4-methylpiperazin-1-yl)methyl)-7,8-dihydro-[1,4]dioxino[2,3-g]quinazolin-4-amine.

The term "physically stable," as used herein, means that a particular free base or salt form does not change into one or more different physical forms (e.g., different solid forms as measured by XRPD, DSC, etc.) when subjected to specified conditions, e.g., room temperature ambient humidity or 40° C./75% relative humidity, for a specified period of time, e.g., 1 day, 2 days, 3 days, 1 week, 2 weeks, 1 month, 2 months, 3 months, 6 months, 12 months, 18 months, 24 months, or longer. In some embodiments, less than 25% of the form of a compound changes into one or more different physical forms when subjected to specified conditions. In some embodiments, less than about 20%, less than about 15%, less than about 10%, less than about 5%, less than about 3%, less than about 10%, less than about 0.5% of the form of a particular compound changes into one or more different physical forms of that particular compound when subjected to specified conditions. In some embodiments, no detectable amount of the particular form of a compound changes into one or more different physical forms of the compound.

The term "chemically stable," as used herein, means that the chemical structure of a particular compound, does not change into another compound (e.g., decompose) when subjected to specified conditions, e.g., room temperature ambient humidity or 40° C./75% relative humidity, for a specified period of time, e.g., 1 day, 2 days, 3 days, 1 week, 2 weeks, 1 month, 2 months, 3 months, 6 months, 12 months, 18 months, 24 months, or longer. In some embodiments, less than 25% of the form of a particular compound changes into one or more other compounds when subjected to specified conditions. In some embodiments, less than about 20%, less than about 15%, less than about 10%, less than about 5%, less than about 3%, less than about 1%, less than about 0.5% of the form of a particular compound changes into one or more other compounds when subjected to specified conditions. In some embodiments, no detectable amount of the form of a particular compound changes into one or more different physical forms of that particular compound.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" refers to a value of 7.2 to 8.8, inclusive; as another example, the phrase "about 8%" refers to a value of 7.2% to 8.8%, inclusive. Where present, all ranges are inclusive and combinable.

"Solid forms" refer to polymorphic forms of a chemical compound. A solid form can exist as a crystalline solid or an amorphous solid.

"Hydrochloride" refers to the structure where the proton is ionically bonded to the most basic site on the compound, e.g., a nitrogen atom, and the chloride is the counteranion.

If there is a discrepancy between a depicted structure and a name given to that structure, then the depicted structure controls. Additionally, if the stereochemistry of a structure or a portion of a structure is not indicated with, for example, bold or dashed lines, the structure or portion of the structure is to be interpreted as encompassing all stereoisomers of it. In some cases, however, where more than one chiral center exists, the structures and names may be represented as single enantiomers to help describe the relative stereochemistry. Those skilled in the art of organic synthesis will know if the compounds are prepared as single enantiomers from the methods used to prepare them.

In this description, the term "tautomer" or "tautomeric form" refers to structural isomers of different energies which are interconvertible via a low energy barrier. For example, proton tautomers (also known as prototropic tautomers) include interconversions via migration of a proton, such as keto-enol and imine-enamine isomerizations. Valence tautomers include interconversions by reorganization of some of the bonding electrons.

The terms "treat," "treating," and "treatment" refer to the amelioration or eradication of a disease or symptoms associated with a disease. In embodiments, such terms refer to minimizing the spread or worsening of the disease resulting from the administration of one or more prophylactic or therapeutic agents to a patient with such a disease. In the context of the present disclosure the terms "treat," "treating," and "treatment" also refer to:

(i) preventing the disease or condition from occurring in a mammal, in particular, when such mammal is predisposed to the condition but has not yet been diagnosed as having it;

(ii) inhibiting the disease or condition, i.e., arresting its development;

(iii) relieving the disease or condition, i.e., causing regression of the disease or condition; or (iv) relieving the symptoms resulting from the disease or condition, i.e., relieving pain without addressing the underlying disease or condition. As used herein, the terms "disease" and "condition" may be used interchangeably or may be different in that the particular malady or condition may not have a known causative agent (so that etiology has not yet been worked out) and it is therefore not yet recognized as a disease but only as an undesirable condition or syndrome, wherein a more or less specific set of symptoms have been identified by clinicians.

The term "effective amount" refers to an amount of a compound or other active ingredient sufficient to provide a therapeutic or prophylactic benefit in the treatment or prevention of a disease or to delay or minimize symptoms associated with a disease. Further, a therapeutically effective amount with respect to a compound means that amount of therapeutic agent alone, or in combination with other therapies, that provides a therapeutic benefit in the treatment or prevention of a disease. Used in connection with a compound, the term can encompass an amount that improves overall therapy, reduces or avoids symptoms or causes of disease, or enhances the therapeutic efficacy or synergies with another therapeutic agent.

A "patient" or "subject" includes an animal, such as a human, cow, horse, sheep, lamb, pig, chicken, turkey, quail, cat, dog, mouse, rat, rabbit or guinea pig. The animal can be a mammal such as a non-primate and a primate (e.g., monkey and human). In one embodiment, a patient is a human, such as a human infant, child, adolescent, or adult.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a salt of the compound useful within the disclosed embodiments or to the subject such that it may perform its intended function. Each carrier must be "acceptable" in the sense of being compatible with the other ingredients of the formulation, including the salt useful within the disclosed embodiments, and not injurious to the subject. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations.

Proper formulation is dependent upon the route of administration chosen. Additional details about suitable excipients for pharmaceutical compositions described herein may be found, for example, in Remington: The Science and Practice of Pharmacy, Volume I and Volume II, Twenty-Second Edition, Loyd V. Allen, Jr., editor (Philadelphia, PA: Pharmaceutical Press, 2012); Excipient Development for Pharmaceutical, Biotechnology, and Drug Delivery Systems, Ashok Katdare and Mahesh V. Chaubal, editors (Boca Raton, FL: CRC Press, 2006); and Pharmaceutical Dosage Forms and Drug Delivery Systems, Seventh Ed. (Lippincott Williams & Wilkins 1999), herein incorporated by reference for such disclosure.

A pharmaceutical composition, as used herein, refers to a mixture of a crystalline solid polymorph form of Compound (I) as described herein, with other chemical components, such as carriers, stabilizers, diluents, dispersing agents, suspending agents, thickening agents, and/or excipients. The pharmaceutical composition facilitates administration of the compound to an organism.

In embodiments, there is provided a polymorph of Compound (I), free base, having the structure:

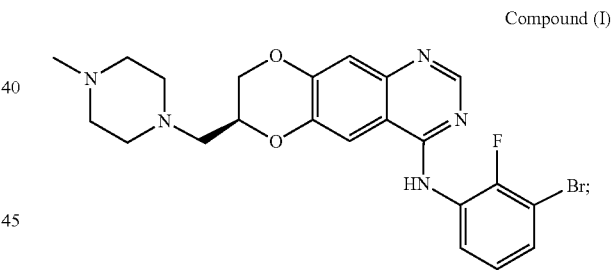

Compound (I)

wherein the polymorph is:

(1) Form A which has an X-ray diffraction pattern with characteristic peaks characterized in values of degrees 2-theta at about 4.9±0.2, about 13.9±0.2, about 22.1±0.2, and about 25.1±0.2; in embodiments, Form A is characterized by 2, 3 or 4 of the foregoing peaks;

(2) Form B which has an X-ray diffraction pattern with characteristic peaks characterized in values of degrees 2-theta at about 4.8±0.2, about 9.8±0.2, about 13.8±0.2, about 14.7±0.2, about 17.7±0.2, about 20.2±0.2, about 24.1±0.2, about 24.6±0.2 and about 25.1±0.2; in embodiments, Form B is characterized by 2, 3, 4, 5, up to all of the foregoing peaks;

(3) Form C which has an X-ray diffraction pattern with characteristic peaks characterized in values of degrees 2-theta at about 4.9±0.2, about 22.9±0.2, about 23.2±0.2, about 23.7±0.2 and about 24.3±0.2; in embodiments, Form C is characterized by 2, 3, 4, or 5 of the foregoing peaks; or (4) Form D which has an X-ray diffraction pattern with characteristic peaks characterized in values of degrees 2-theta at about 15.6±0.2, about 16.9±0.2, about 19.1±0.2, about 19.5±0.2, about 22.5±0.2 and about 26.0±0.2; in embodiments, Form B is characterized by 2, 3, 4, 5, up to all of the foregoing peaks.

In embodiments, the polymorph is Form A, and Form A has an X-ray diffraction pattern with characteristic peaks characterized in values of degrees 2-theta at about 4.9±0.2, about 12.0±0.2, about 13.9±0.2, about 14.8±0.2, about 15.5±0.2, about 15.9±0.2, about 17.8±0.2, about 20.4±0.2, about 21.0±0.2, about 22.1±0.2, about 23.0±0.2, about 23.6±0.2, about 24.3±0.2, about 24.8±0.2, about 25.1±0.2, about 26.3±0.2 and about 27.3±0.2.

In embodiments, the polymorph is Form C, and Form C has an X-ray diffraction pattern with characteristic peaks characterized in values of degrees 2-theta at about 4.9±0.2, about 9.8±0.2, about 12.1±0.2, about 14.4±0.2, 14.7±0.2, about 20.2±0.2, about 23.2±0.2, about 23.7±0.2, 24.3±0.2, about 24.6±0.2, and about 26.1±0.2.

In embodiments, the polymorph is Form D, and Form D has an X-ray diffraction pattern with characteristic peaks characterized in values of degrees 2-theta at about 15.2±0.2, about 15.6±0.2, about 16.9±0.2, about 19.1±0.2, about 19.5±0.2, about 22.5±0.2 and about 26.0±0.2.

In embodiments, the polymorph is Form D, and Form D has an X-ray diffraction pattern with characteristic peaks characterized in values of degrees 2-theta at about 10.2±0.2, about 13.5±0.2, about 15.2±0.2, about 15.6±0.2, about 15.9±0.2, about 16.9±0.2, 19.1±0.2, about 19.5±0.2, about 22.5±0.2, about 23.3±0.2, about 24.3±0.2, about 24.7±0.2, about 24.9±0.2, about 26.0±0.2, about 27.9±0.2 and about 29.6±0.2.

In embodiments, the polymorph is Form D having a melting point of about 153° C.

Figure 2A:
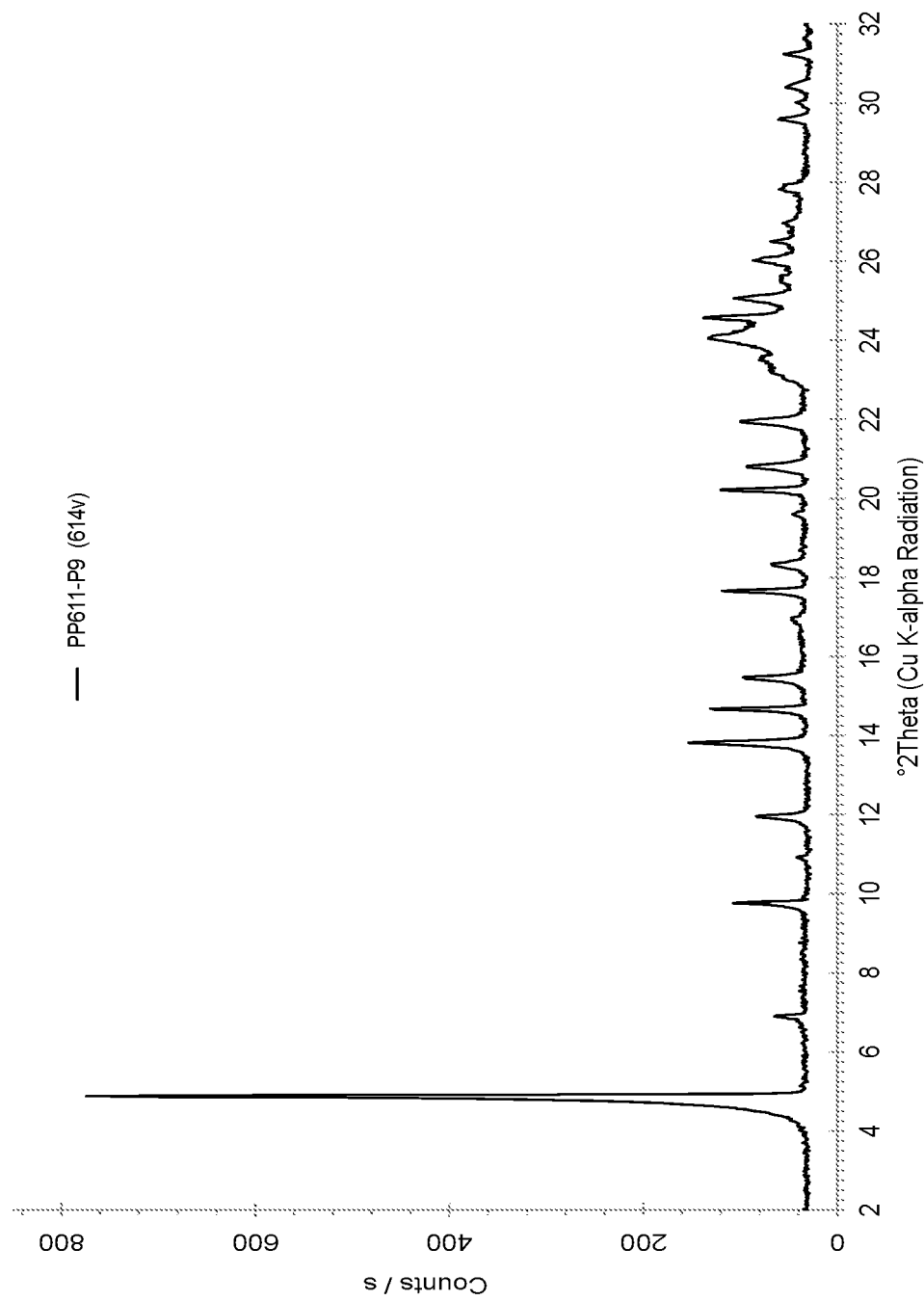
FIG. 2A shows a powder X-ray diffraction (PXRD) spectrum of crystalline Form B of Compound (I).
Figure 3:
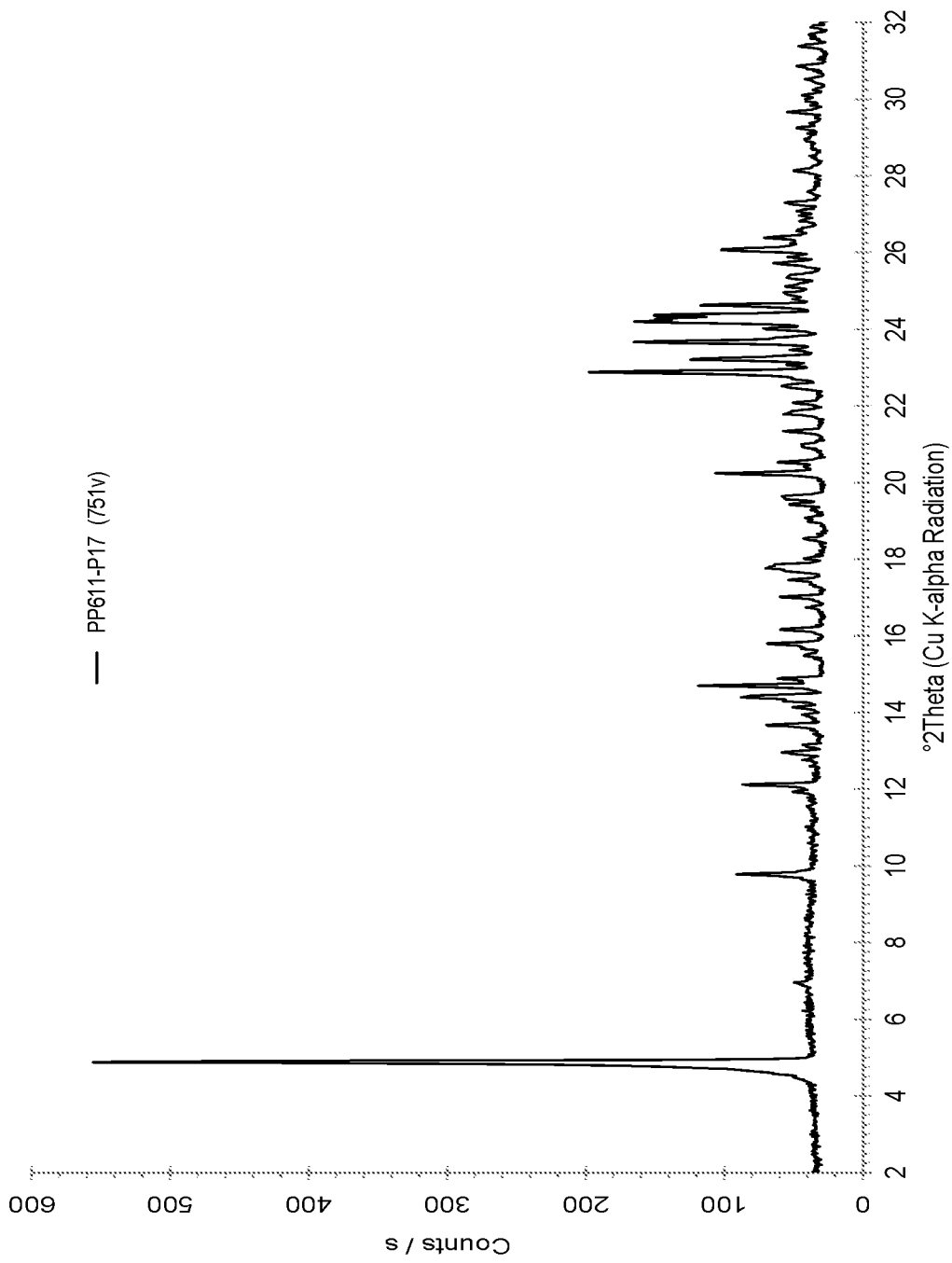
FIG. 3 shows a powder X-ray diffraction (PXRD) spectrum of crystalline Form C of Compound (I).
Figure 4A:
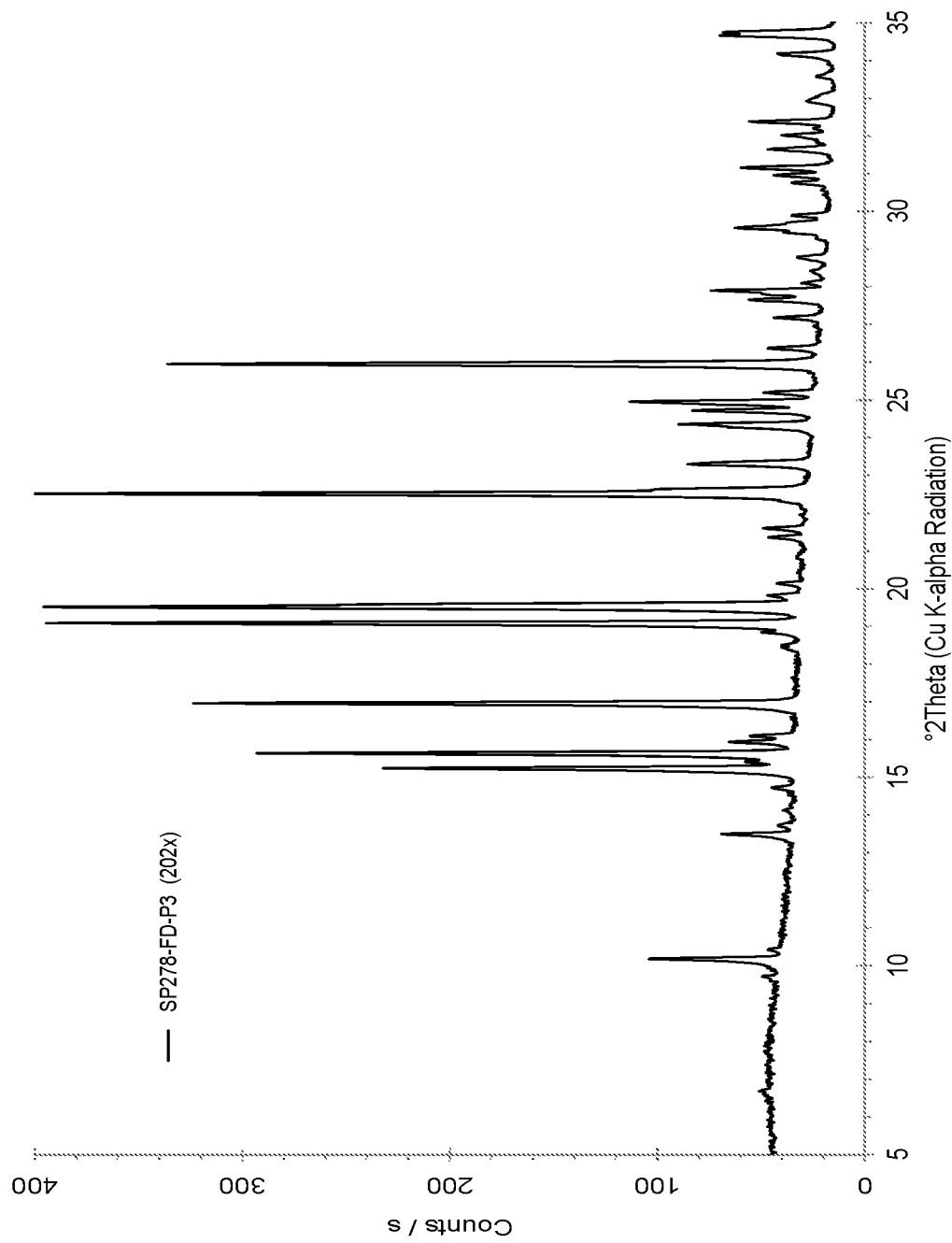
FIG. 4A shows a powder X-ray diffraction (PXRD) spectrum of crystalline Form D of Compound (I).

In embodiments, the polymorph is Form A, as shown in FIG. 1 and having a peak listing provided in Table 4. In embodiments, the polymorph is Form B, as shown in FIG. 2a and having a peak listing provided in Table 5. In embodiments, the polymorph is Form C, as shown in FIG. 3 and having a peak listing provided in Table 6. In embodiments, the polymorph is Form D, as shown in FIG. 4a and having a peak listing provided in Table 8.

In embodiments, there is provided a method of forming a polymorph of Compound (I), the method comprising converting amorphous Compound (I) into a polymorph form by equilibration, suspension equilibration, slurrying, seeding, evaporation, or combinations thereof. In embodiments, Form A, Form B, or Form C are formed from amorphous Compound (I) in the presence of water. In embodiments, Form D is formed from amorphous Compound (I) in a non-aqueous solvent system.

In embodiments, there is provided a method of forming Form A polymorph of Compound (I) comprising one of:
(a) crystallizing amorphous Compound (I) in isopropyl alcohol:water (1:1), and equilibrating the crystallized amorphous Compound (I);
(b) suspension equilibrating Form D in acetonitrile:water (9:1); or
(c) suspension equilibrating amorphous Compound (I) in water saturated TBME.

In embodiments, there is provided a method of forming Form B polymorph of Compound (I) comprising one of:
(a) suspension equilibrating amorphous Compound (I) in water:ethanol (2:1); or
(b) suspension equilibrating Form D in water;

In embodiments, there is provided a method of forming Form C polymorph of Compound (I) comprising recrystallizing Compound (I) from a solution in acetonitrile:water 5.5:2 followed by equilibration at 5° C.

In embodiments, there is provided a method of forming Form D polymorph of Compound (I) comprising crystallizing amorphous Compound (I) in a non-aqueous solvent system and converting amorphous Compound (I) to Form D via slurrying, seeding, equilibrating, suspension equilibrating or combinations thereof. In embodiments, such methods employ one of:
(a) slurrying in ethyl acetate;
(b) seeding with Form D in ethyl acetate;
(c) slurrying in acetonitrile;
(d) suspension equilibrating in isopropyl acetate:cyclohexane (1:2);
(e) suspension equilibrating in methyl ethyl ketone (MEK):diisopropyl ether;
(f) suspension equilibrating in methyl ethyl ketone (MEK):p-xylene (1:2) and partial evaporation of solvent;
(g) equilibrating in methyl THF:methylcyclohexane (1:2);
(h) equilibrating in isopropyl acetate:heptane (2:3);
(i) equilibrating in isopropyl acetate:heptane (1:1);
(j) suspension equilibrating in n-butyl acetate:heptane (5:2);
(k) suspension equilibrating in TBME with seeding with Form D;
(l) suspension equilibrating in heptane:MIBK (4:1);
(m) suspension equilibrating in methanol:methylcyclohexane (1:4);
(n) suspension equilibrating in trimethylamine; or
(o) suspension equilibrating in diisopropylether.

In embodiments, there is provided a method of forming Form D polymorph of Compound (I), the method comprising evaporating a solution of Compound (I) in one of:
(a) acetone:heptane (1:3);
(b) n-butyl acetate; or
(c) methanol:diisopropyl ether (1:12).

In embodiments, each of the above methods for forming a polymorph of Compound (I) can control or employ one or more conditions selected from temperature, stirring/mixing conditions, cooling rate, processing time, concentration, and pH.

In embodiments, each polymorph form A, B, C, and D, and the amorphous form of Compound (I) can be interconverted into each other by varying the conditions to those described in preparing the specific desired polymorph form. In some such embodiments, interconversion can proceed by way of the amorphous form. For example, in embodiments, Form A can be converted to Form D via conversion of Form A to the amorphous form, and then from the amorphous form to Form D. Thus, as indicated in the Examples below, drying Form A can be carried out to the point of reforming the amorphous form of Compound (I), followed by conditions to prepare Form D. Similarly, Form B can be converted to amorphous form and thence to Form D. Likewise, Form C can be converted to amorphous form and thence to Form D. As indicated further below, the ability to use Forms A, B, and C to generate highly crystalline solids can aid in the purification of Compound (I). Accordingly, methods of purification described herein below can take advantage of the facile interconversion of polymorph forms and their amorphous form. In some embodiments, each of Forms A, B, and C can be converted directly to Form D via equilibration under conditions used to prepare Form D. Accordingly, such interconversions need not pass through the amorphous form.

As disclosed herein below in the Examples, polymorph forms of Compound (I) possess high crystallinity. As such the polymorph forms are especially suitable to aid in purification of Compound (I). In embodiments, a method of purifying Compound (I) comprises preparing a polymorph of Compound (I) according to any of the methods disclosed herein and isolating crystals of the polymorph. In embodiments, there is provided a method of purifying Compound (I):

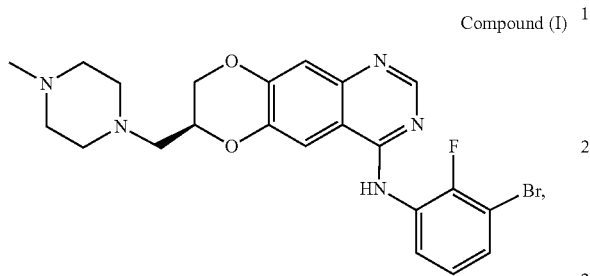

Compound (I)

the method comprising preparing crystals of polymorph Form A and isolating the crystals of polymorph Form A.

In embodiments, there is provided a method of purifying Compound (I):

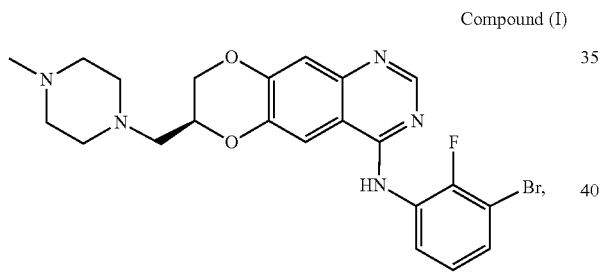

Compound (I)

the method comprising preparing crystals of polymorph Form B and isolating the crystals of polymorph Form B.

In embodiments, there is provided a method of purifying Compound (I):

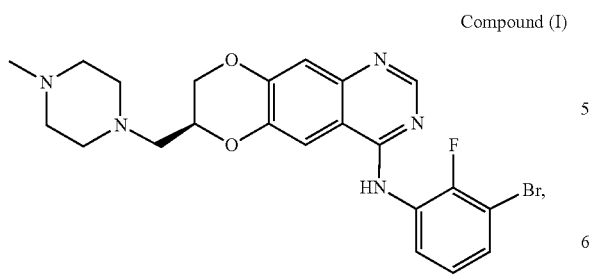

Compound (I)

the method comprising preparing crystals of polymorph Form C and isolating the crystals of polymorph Form C.

In embodiments, there is provided a method of purifying Compound (I):

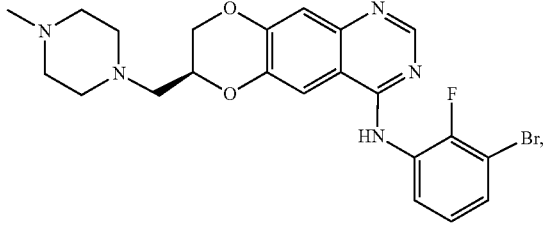

Compound (I)

the method comprising preparing crystals of polymorph Form D and isolating the crystals of polymorph Form D.

In embodiments, there is provided a pharmaceutical composition comprising a polymorph form of Compound (I), as disclosed herein, and a pharmaceutically acceptable excipient.

The pharmaceutical compositions and methods of the present disclosure may be utilized to treat an individual in need thereof. In embodiments, the individual is a mammal such as a human, or a non-human mammal. When administered to an animal, such as a human, the composition or the compound is preferably administered as a pharmaceutical composition comprising, for example, a compound and a pharmaceutically acceptable carrier. Pharmaceutically acceptable carriers are well known in the art and include, for example, aqueous solutions such as water or physiologically buffered saline or other solvents or vehicles such as glycols, glycerol, oils such as olive oil, or injectable organic esters. In preferred embodiments, when such pharmaceutical compositions are for human administration, particularly for invasive routes of administration (i.e., routes, such as injection or implantation, that circumvent transport or diffusion through an epithelial barrier), the aqueous solution is pyrogen-free, or substantially pyrogen-free. The excipients can be chosen, for example, to effect delayed release of an agent or to selectively target one or more cells, tissues or organs. The pharmaceutical composition can be in dosage unit form such as tablet, capsule (including sprinkle capsule and gelatin capsule), granule, lyophiles for reconstitution, powder, solution, syrup, suppository, injection or the like. The composition can also be present in a transdermal delivery system, e.g., a skin patch. The composition can also be present in a solution suitable for topical administration, such as a lotion, cream, or ointment.

A pharmaceutically acceptable carrier can contain physiologically acceptable agents that act, for example, to stabilize, increase solubility or to increase the absorption of a compound. Such physiologically acceptable agents include, for example, carbohydrates, such as glucose, sucrose or dextrans, antioxidants, such as ascorbic acid or glutathione, chelating agents, low molecular weight proteins or other stabilizers or excipients. The choice of a pharmaceutically acceptable carrier, including a physiologically acceptable agent, depends, for example, on the route of administration of the composition. The preparation or pharmaceutical composition can be a self emulsifying drug delivery system or a self microemulsifying drug delivery system. The pharmaceutical composition (preparation) also can be a liposome or other polymer matrix, which can have incorporated therein, for example, a compound. Liposomes, for example, which comprise phospholipids or other lipids, are nontoxic, physiologically acceptable and metabolizable carriers that are relatively simple to make and administer.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically acceptable material, composition or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (!) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil, (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

A pharmaceutical composition (preparation) can be administered to a subject by any of a number of routes of administration including, for example, orally (for example, drenches as in aqueous or non-aqueous solutions or suspensions, tablets, capsules (including sprinkle capsules and gelatin capsules), boluses, powders, granules, pastes for application to the tongue); absorption through the oral mucosa (e.g., sublingually); subcutaneously; transdermally (for example as a patch applied to the skin); and topically (for example, as a cream, ointment or spray applied to the skin). The compound may also be formulated for inhalation. In embodiments, a compound may be simply dissolved or suspended in sterile water. Details of appropriate routes of administration and compositions suitable for same can be found in, for example, U.S. Pat. Nos. 6,110,973, 5,763,493, 5,731,000, 5,541,231, 5,427,798, 5,358,970 and 4,172,896, as well as in patents cited therein.

The formulations may conveniently be presented in unit dosage form and may be prepared by any methods well known in the art of pharmacy. The amount of active ingredient which can be combined with a carrier material to produce a single dosage form will vary depending upon the host being treated, the particular mode of administration. The amount of active ingredient that can be combined with a carrier material to produce a single dosage form will generally be that amount of the compound which produces a therapeutic effect. Generally, out of one hundred percent, this amount will range from about 1 percent to about ninety-nine percent of active ingredient, preferably from about 5 percent to about 70 percent, most preferably from about 10 percent to about 30 percent.

Methods of preparing these formulations or compositions include the step of bringing into association an active compound, such as a compound, with the carrier and, optionally, one or more accessory ingredients. In general, the formulations are prepared by uniformly and intimately bringing into association a compound of the present disclosure with liquid carriers, or finely divided solid carriers, or both, and then, if necessary, shaping the product.

Formulations of the polymorph compounds disclosed herein suitable for oral administration may be in the form of capsules (including sprinkle capsules and gelatin capsules), cachets, pills, tablets, lozenges (using a flavored basis, usually sucrose and acacia or tragacanth), lyophile, powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present disclosure as an active ingredient. Compositions or compounds may also be administered as a bolus, electuary or paste.

To prepare solid dosage forms for oral administration (capsules (including sprinkle capsules and gelatin capsules), tablets, pills, dragees, powders, granules and the like), the active ingredient is mixed with one or more pharmaceutically acceptable earners, such as sodium citrate or dicalcium phosphate, and/or any of the following: (1) fillers or extenders, such as starches, lactose, sucrose, glucose, mannitol, and/or silicic acid; (2) binders, such as. for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such a talc, calcium stearate, magnesium stearate, solid polyethylene glycols, sodium lauryl sulfate, and mixtures thereof; (50) complexing agents, such as, modified and unmodified cyclodextrins; and (11) coloring agents. In the case of capsules (including sprinkle capsules and gelatin capsules), tablets and pills, the pharmaceutical compositions may also comprise buffering agents. Solid compositions of a similar type may also be employed as fillers in soft and hard-filled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface—active or dispersing agent. Molded tablets may be made by molding in a suitable machine a mixture of the powdered compound moistened with an inert liquid diluent.

The tablets, and other solid dosage forms of the pharmaceutical compositions, such as dragees, capsules (including sprinkle capsules and gelatin capsules), pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be sterilized by, for example, filtration through a bacteria-retaining filter, or by incorporating sterilizing agents in the form of sterile solid compositions that can be dissolved in sterile water, or some other sterile injectable medium immediately before use. These compositions may also optionally contain opacifying agents and may be of a composition that they release the active ingredients) only, or preferentially, in a certain portion of the gastrointestinal tract, optionally, in a delayed manner. Examples of embedding compositions that can be used include polymeric substances and waxes. The active ingredient can also be in micro-encapsulated form, if appropriate, with one or more of the above-described excipients.

Liquid dosage forms useful for oral administration include pharmaceutically acceptable emulsions, lyophiles for reconstitution, microemulsions, solutions, suspensions, syrups and elixirs. In addition to the active ingredient, the liquid dosage forms may contain inert diluents commonly used in the art, such as, for example, water or other solvents, cyclodextrins and derivatives thereof, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents.

Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Dosage forms for the topical or transdermal administration include powders, sprays, ointments, pastes, creams, lotions, gels, solutions, patches and inhalants. The active compound may be mixed under sterile conditions with a pharmaceutically acceptable carrier, and with any preservatives, buffers, or propellants that may be required.

The ointments, pastes, creams and gels may contain, in addition to an active compound, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an active compound, excipients such as lactose, talc, silicic acid, aluminum hydroxide, calcium silicates and polyamide powder, or mixtures of these substances. Sprays can additionally contain customary propellants, such as chlorofluorohydrocarbon s and volatile unsubstituted hydrocarbons, such as butane and propane.

Transdermal patches have the added advantage of providing controlled delivery' of a compound of the present disclosure to the body. Such dosage forms can be made by dissolving or dispersing the active compound in the proper medium. Absorption enhancers can also be used to increase the flux of the compound across the skin. The rate of such flux can be controlled by either providing a rate controlling membrane or dispersing the compound in a polymer matrix or gel.

The phrases "parenteral administration" and "administered parenterally" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion. Pharmaceutical compositions suitable for parenteral administration comprise one or more active compounds in combination with one or more pharmaceutically acceptable sterile isotonic aqueous or non-aqueous solutions, dispersions, suspensions or emulsions, or sterile powders which may be reconstituted into sterile injectable solutions or dispersions just prior to use, which may contain antioxidants, buffers, bacteriostats, solutes which render the formulation isotonic with the blood of the intended recipient or suspending or thickening agents.

Examples of suitable aqueous and non-aqueous carriers that may be employed in the pharmaceutical compositions include water, ethanol, polyols (such as glycerol, propylene glycol, polyethylene glycol, and the like), and suitable mixtures thereof, vegetable oils, such as olive oil, and injectable organic esters, such as ethyl oleate. Proper fluidity can be maintained, for example, by the use of coating materials, such as lecithin, by the maintenance of the required particle size in the case of dispersions, and by the use of surfactants.

These compositions may also contain adjuvants such as preservatives, wetting agents, emulsifying agents and dispersing agents. Prevention of the action of microorganisms may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents that delay absorption such as aluminum monostearate and gelatin.

In some cases, in order to prolong the effect of a drug, it is desirable to slow the absorption of the drug from subcutaneous or intramuscular injection. This may be accomplished by the use of a liquid suspension of crystalline or amorphous material having poor water solubility. The rate of absorption of the drug then depends upon its rate of dissolution, which, in turn, may depend upon crystal size and crystalline form. Alternatively, delayed absorption of a parenterally administered drug form is accomplished by dissolving or suspending the drug in an oil vehicle.

Injectable depot forms are made by forming microencapsulated matrices of the subject compounds in biodegradable polymers such as polylactide-polyglycolide. Depending on the ratio of drug to polymer, and the nature of the particular polymer employed, the rate of drug release can be controlled. Examples of other biodegradable polymers include poly(orthoesters) and polyanhydrides). Depot injectable formulations are also prepared by entrapping the drug in liposomes or microemulsions that are compatible with body tissue.

For use in the methods of this invent on, active compounds can be given per se or as a pharmaceutical composition containing, for example, 0.1 to 99.5% (more preferably, 0.5 to 90%) of active ingredient in combination with a pharmaceutically acceptable carrier.

Methods of introduction may also be provided by rechargeable or biodegradable devices. Various slow release polymeric devices have been developed and tested in vivo in recent years for the controlled delivery, of drugs, including proteinaceous biopharmaceuticals. A variety of biocompatible polymers (including hydrogels), including both biodegradable and non-degradable polymers, can be used to form an Implant for the sustained release of a compound at a particular target site.

Actual dosage levels of the active ingredients in the pharmaceutical compositions may be varied so as to obtain an amount of the active ingredient that is effective to achieve the desired therapeutic response for a particular patient, composition, and mode of administration, without being toxic to the patient.

The selected dosage level will depend upon a variety of factors including the activity of the particular compound or combination of compounds employed, or the ester, salt or amide thereof) the route of administration, the time of administration, the rate of excretion of the particular compound(s) being employed, the duration of the treatment, other drugs, compounds and/or materials used in combination with the particular compound(s) employed, the age, sex, weight, condition, general health and prior medical history of the patient being treated, and like factors well known in the medical arts.

A physician or veterinarian having ordinary skill in the art can readily determine and prescribe the therapeutically effective amount of the pharmaceutical composition required.

For example, the physician or veterinarian could start doses of the pharmaceutical composition or compound at levels lower than that required in order to achieve the desired therapeutic effect and gradually increase the dosage until the desired effect is achieved. By "therapeutically effective amount" is meant the concentration of a compound that is sufficient to elicit the desired therapeutic effect. It is generally understood that the effective amount of the compound will vary—according to the weight sex, age, and medical history, of the subject. Other factors which influence the effective amount may include, but are not limited to, the severity of the patient's condition, the disorder being treated, the stability of the compound, and, if desired, another type of therapeutic agent being administered with the compound. A larger total dose can be delivered by multiple administrations of the agent. Methods to determine efficacy and dosage are known to those skilled in the art (Isselbaeher et al. (1996) Harrison's Principles of Internal Medicine 13 ed., 1814-1882, herein incorporated by reference).

In general, a suitable daily dose of an active compound used in the compositions and methods will be that amount of the compound that is the lowest dose effective to produce a therapeutic effect. Such an effective dose will generally depend upon the factors described above.

If desired, the effective daily dose of the active compound may be administered as one, two, three, four, five, six or more sub-doses administered separately at appropriate intervals throughout the day, optionally, in unit dosage forms. In embodiments of the present disclosure, the active compound may be administered two or three times daily. In preferred embodiments, the active compound will be administered once daily.

The patient receiving this treatment is any animal in need, including primates, in particular humans; and other mammals such as equines, cattle, swine, sheep, cats, and dogs; poultry'; and pets in general.

In embodiments, compounds disclosed herein may be used alone or conjointly administered with another type of therapeutic agent.

In embodiments, there is provided a method of treating a subject having cancer comprising administering to the subject one or more polymorph forms A, B, C, or D of Compound (I), as disclosed herein. In some such embodiments, the cancer is characterized by aberrant EGFR expression. In some such embodiments, the cancer is brain cancer.

In embodiments, there is provided a use of one or more polymorph forms A, B, C, or D of Compound (I), as disclosed herein, in the manufacture of a medicament for treating a subject having cancer. In some such embodiments, the cancer is characterized by aberrant EGFR expression. In some such embodiments, the cancer is brain cancer.

In embodiments, there is provided a method of treating a subject having a cancer associated with aberrant EGFR expression, the method comprising administering to the subject one or more polymorph forms A, B, C, or D of Compound (I), as disclosed herein. In embodiments, the cancer is brain cancer.

In embodiments, there is provided a use of one or more polymorph forms A, B, C, or D of Compound (I) in the manufacture of a medicament for treating a subject having a cancer associated with aberrant EGFR expression. In embodiments, the cancer is brain cancer.

In certain aspects, the present disclosure provides methods of inhibiting EGFR or AEGFR, comprising administering to a subject an amount of a polymorph form of Compound (I), Forms A, B, C, D, or combinations thereof.

In certain aspects, the present disclosure provides methods of treating cancer comprising of administering to a subject in need of a treatment for cancer an amount of a polymorph of Compound (I), as disclosed herein. In embodiments, the cancer is bladder cancer, bone cancer, brain cancer, breast cancer, cardiac cancer, cervical cancer, colon cancer, colorectal cancer, esophageal cancer, fibrosarcoma, gastric cancer, gastrointestinal cancer, head, spine and neck cancer, Kaposi's sarcoma, kidney cancer, leukemia, liver cancer, lymphoma, melanoma, multiple myeloma, pancreatic cancer, penile cancer, testicular germ cell cancer, thymoma carcinoma, thymic carcinoma, lung cancer, ovarian cancer, or prostate cancer. In embodiments, the cancer is glioma, astrocytoma or glioblastoma. In embodiments, the cancer is glioblastoma. In embodiments, the cancer is glioblastoma multiforme. In embodiments, the method reduces cancer cell proliferation.

In certain aspects, the present disclosure provides methods of treating cancer in a subject, the method comprising administering to the subject a glucose metabolic inhibitor and an additional agent, wherein the glucose metabolism is a polymorph of Compound (I) of the disclosure or a pharmaceutically acceptable salt thereof and the additional agent is a cytoplasmic p53 stabilizer. In embodiments, the cancer is bladder cancer, bone cancer, brain cancer, breast cancer, cardiac cancer, cervical cancer, colon cancer, colorectal cancer, esophageal cancer, fibrosarcoma, gastric cancer, gastrointestinal cancer, head, spine and neck cancer, Kaposi's sarcoma, kidney cancer, leukemia, liver cancer, lymphoma, melanoma, multiple myeloma, pancreatic cancer, penile cancer, testicular germ cell cancer, thymoma carcinoma, thymic carcinoma, lung cancer, ovarian cancer, or prostate cancer. In embodiments, the cancer is glioma, astrocytoma or glioblastoma. In embodiments, the cancer is glioblastoma. In embodiments, the cancer is glioblastoma multiforme. In embodiments, the method reduces cancer cell proliferation. In embodiments, the cancer is relapsed or refractory. In other embodiments, the cancer is treatment naive.

In embodiments, the subject has been determined to be susceptible to the glucose metabolism inhibitor by a method comprising:
    a. obtaining a first blood sample from the subject;
    b. placing the subject on a ketogenic diet;
    c. obtaining a second blood sample from the subject after being placed on a ketogenic diet for a period of time;

d. measuring glucose level in the first and in the second blood sample;

e. comparing the glucose level in the second blood sample with the glucose level in the first blood sample; and f. determining that the subject is susceptible if the glucose level in the second blood sample is reduced as compared to glucose levels in the first blood sample.

In embodiments, the reduction in the glucose level between the second blood sample and the control blood sample is about or greater than 0.15 mM. In embodiments, the reduction in the glucose level between the second blood sample and the control blood sample is about or greater than 0.20 mM. In embodiments, the reduction in the glucose level between the second blood sample and the control blood sample is in the range of 0.15 mM-2.0 mM. In embodiments, the reduction in the glucose level between the second blood sample and the control blood sample is in the range of 0.25 mM-1.0 mM.

In embodiments, the cytoplasmic p53 stabilizer is an MDM2 inhibitor. In embodiments, the MDM2 inhibitor is a nutlin. In embodiments, the MDM2 inhibitor is nutlin-3 or idasanutlin. In embodiments, the subject is administered 50 mg to 1600 mg of idasanutlin. In embodiments, the subject is administered 100 mg of idasanutlin. In embodiments, the subject is administered 150 mg of idasanutlin. In embodiments, the subject is administered 300 mg of idasanutlin. In embodiments, the subject is administered 400 mg of idasanutlin.

In embodiments, the subject is administered 600 mg of idasanutlin. In embodiments, the subject is administered 1600 g of idasanutlin. In other embodiments, the MDM2 inhibitor is RO5045337, RO550378L R06839921, SAR405838, DS-3032, DS-3032b, or AMG-232.

In embodiments, the cytoplasmic p53 stabilizer is a BCL-2 inhibitor. In embodiments, the BCL-2 inhibitor is antisense oligodeoxynueleotide G3139, mRNA antagonist SPC2996, venetoclax (ABT-199), GDC-0199, obatoclax, paclitaxel, navitoclax (ABT-263), ABT-737, NU-0129, S 055746, or APG-1252.

In embodiments, the cytoplasmic p53 stabilizer is a Bcl-xL inhibitor. In embodiments, the Bcl-xL inhibitor is WEHI 539, ABT-263, ABT-199, ABT-737, sabutoclax, ATI 01, TW-37, APG-1252, or gambogic acid.

In embodiments, the glucose metabolism inhibitor and the cytoplasmic p53 stabilizer are administered in the same composition. In other embodiments, the glucose metabolism inhibitor and the cytoplasmic p53 stabilizer are administered in separate compositions.

In embodiments, the method further comprises administration of an additional therapy.

Types and Stages of Gliomas

Primary malignant brain tumors are tumors that start in the brain or spine are known collectively as gliomas. Gliomas are not a specific type of cancer but are a term used to describe tumors that originate in glial cells. Examples of primary, malignant brain tumors include astrocytomas, pilocytic astrocytomas, pleomorphic xanthoastrocytomas, diffuse astrocytomas, anaplastic astrocytomas, GBMs, gangliogfiomas, oligodendrogliomas, ependymomas. According to the WHO classification of brain tumors, astrocytomas have been categorized into four grades, determined by the underlying pathology. The characteristics that are used to classify gliomas include mitoses, cellular or nuclear atypia, and vascular proliferation and necrosis with pseudopalisading features. Malignant (or high-grade) gliomas include anaplastic glioma (WHO grade III) as well as glioblastoma muUiforme (GBM; WHO grade IV). These are the most aggressive brain tumors with the worst prognosis.

GBMs is the most common, complex, treatment resistant, and deadliest type of brain cancer, accounting for 45% of all brain cancers, with nearly 11,000 men, women, and children diagnosed each year. GBM (also known as grade-4 astrocytoma and glioblastoma multiforme) are the most common types of malignant (cancerous) primary brain tumors.

They are extremely aggressive for a number of reasons. First, glioblastoma ceils multiply quickly, as they secrete substances that stimulate a rich blood supply. They also have an ability to invade and infiltrate long distances into the normal brain by sending microscopic tendrils of tumor alongside normal cells. Two types of glioblastomas are known. Primary GBM are the most common form; they grow quickly and often cause symptoms early.

Secondary glioblastomas are less common, accounting for about 10 percent of all GBMs. They progress from low-grade diffuse astrocytoma or anaplastic astrocytoma, and are more often found in younger patients. Secondary GBM are preferentially located in the frontal lobe and carry a better prognosis.

GBM is usually treated by combined multi-modal treatment plan including surgical removal of the tumor, radiation and chemotherapy. First, as much tumor as possible is removed during surgery. The tumor's location in the brain often determines how much of it can be safely removed. After surgery, radiation and chemotherapy slow the growth of remaining tumor cells. The oral chemotherapy drug, temozolomide, is most often used for six weeks, and then monthly thereafter. Another drug, bevacizumab (known as Avastin®), is also used during treatment. This drug attacks the tumor's ability to recruit blood supply, often slowing or even stopping tumor growth Novel investigational treatments are also used and these may involve adding treatments to the standard therapy or replacing one part of the standard therapy with a different treatment that may work better. Some of these treatments include immunotherapy such as vaccine immunotherapies, or low-dose pulses of electricity to the area of the brain where the tumor exists and nano therapies involving spherical nucleic acids (SNAs) such as NU-0129. In some embodiments, the methods of the current disclosure are used in combination with one or more of the aforementioned therapies.

Embodiments of the methods and compositions discussed herein are also contemplated to be applicable to other types of cancers, including but not limited to lung cancer, non-CNS cancers, CNS cancers, and CNS metastases such as brain metastases, leptomeningeai metastases, choroidal metastases, spinal cord metastases, and others.

Cytoplasmic p53 Stabilizers The inventors have demonstrated that the pharmacological p53 stabilization, such as with a CNS-penetrant small molecule, for example, was synergistically lethal with the inhibition of EGFR-driven glucose uptake in patient-derived, primary GBM models. The inventors have demonstrated, for the first time that the non-transcriptional functions of p53 can have a critical role in stimulating intrinsic apoptosis in metabolic responders. Accordingly, the methods of treatment described herein comprise the administration of cytoplasmic p53 stabilizer(s) in combination with glucose metabolism inhibitors. Cytoplasmic p53 stabilizer(s) and glucose metabolism inhibitors can be administered in the same or in different compositions, concomitantly or sequentially. It is contemplated that in some embodiments a single p53 stabilizer is used and in other embodiments more than on p53 stabilizer is used. For example, the combination of nutlin with ABT 737 (which binds BCL-2 and BCL-$X_L$) is reported to synergistically target the balance of pro-apoptotic and anti-apoptotic proteins at the mitochondrial level, thereby promoting cell death. (Hoe et al. 2014. Nature Reviews. Vol. 13. pp. 217) As intended herein, a cytoplasmic p53 stabilizer is any small molecule, antibody, peptide, protein, nucleic acid or derivatives thereof that can pharmacologically stabilize or activate p53 directly or indirectly. The stabilization of cytoplasmic p53 leads to priming cells, such as cancer cells, for apoptosis.

MDM2 Antagonists

Protein levels of p53 within cells are tightly controlled and kept low by its negative regulator, the E3 ubiquitin protein ligase MDM2. In embodiments of the methods or compositions of the current disclosure, the cytoplasmic p53 stabilizer is an MDM2 antagonist/inhibitor. In some embodiments, the MDM2 antagonist is a nutlin. In further embodiments, the nutlin is nutlin-3 or idasanutlin. In other embodiments, the MDM2 antagonist is RO5045337 (also known as RG7112), RO5503781, R06839921, SAR405838 (also known as MI-773), DS-3032, DS-3032b, or AMG-232 or any other MDM2 inhibitor.

Other compounds within the scope of the current methods known to bind MDM-2 include Ro-2443, MI-219, MI-713, MI-888, DS-3032b, benzodiazepinediones (for example, TDP521252), sulphonamides (for example, NSC279287), ehromenotriazolopyrimidine, morpholinone and piperidinones (AM-8553), terphenyls, chalcones, pyrazoles, imidazoles, imidazole-indoles, isoindolinone, pyrrolidinone (for example, PXN822), priaxon, piperidines, naturally derived prenylated xanthones, SAH-8 (stapled peptides) sMTide-02, sMTide-02a (stapled peptides), ATSP-7041 (stapled peptide), spiroligomer (a-helix mimic). Other compounds that are known to cause protein folding of MDM2 include PRIMA-1MET (also known as APR-246) Aprea 102-105, PK083, PK5 174, PK5196, PK7088, benzothiazoles, stictic acid and NSC319726.

BCL-2 Inhibitors

In further embodiments of the current methods or compositions, the cytoplasmic p53 stabilizer is a BCL-2 inhibitor. In some embodiments, the BCL-2 inhibitor is, for example, antisense oligodeoxynucleotide G3139, mRNA antagonist SPC2996, venetoclax (ABT-199), GDC-0199, obatoclax, paclitaxel, navitoclax (ABT-263), ABT-737, NIT-0129, S 055746, APG-1252 or any other BCL-2 inhibitor.

Bcl-xL Inhibitors

In yet further embodiments of the current methods or compositions, the cytoplasmic p53 stabilizer is a Bcl-xL inhibitor. In some embodiments, the Bcl-xL inhibitor is, for example, WEHI 539, ABT-263, ABT-199, ABT-737, sabutoclax, ATI 01, TW-37, APG-1252, gambogic acid or any other Bcl-xL inhibitor.

Methods of Assessment: Glucose Uptake Tests

In embodiments of the methods and compositions of the current disclosure, the subject with GBM or cancer is classified to be either a "metabolic responder" or a "metabolic non-responder" i.e. determined to be susceptible to glucose metabolism inhibitors. In embodiments, the classification of the subject is prior to administering to the subject a treatment comprising a glucose metabolism inhibitor and a cytoplasmic p53 stabilizer. Accordingly, the current disclosure provides for methods for assessing a cancer, classifying a subject, determining the susceptibility of a subject to treatments involve analysis of glucose metabolism, glycolysis or glucose uptake. Methods to classify a subject as metabolic responder is described in details in Example 1. Techniques to monitor glycolysis and glucose uptake is provided by T. TeSlaa and M. A. Teitell. 2014. Methods in Enzymology, Volume 542, pp. 92-114, incorporated herein by reference.

Glycolysis is the intracellular biochemical conversion of one molecule of glucose into two molecules of pyruvate with the concurrent generation of two molecules of ATP. Pyruvate is a metabolic intermediate with several potential fates including entrance into the tricarboxylic acid (TCA) cycle within mitochondria to produce NADH and $FADH_2$. Alternatively, pyruvate can be converted into lactate in the cytosol by lactate dehydrogenase with concurrent regeneration of $NAD^+$ from NADH. An increased flux through glycolysis supports the proliferation of cancer cells by providing, for example, additional energy in the form of ATP as well as glucose-derived metabolic intermediates for nucleotide, lipid, and protein biosynthesis. Warburg (Oncologia. 1956; 9(2):75-83) first observed that proliferating tumor cells augment aerobic glycolysis, the conversion of glucose to lactate in the presence of oxygen, in contrast to nonmalignant cells that mainly respire when oxygen is available.

This mitochondrial bypass, called the Warburg effect, occurs in rapidly proliferating cells including cancer cells, activated lymphocytes, and pluripotent stem cells. The Warburg effect has been exploited for clinical diagnostic tests that use positron emission tomography (PET) scanning to identify increased cellular uptake of fluorinated glucose analogs such as $^{18}$F-deoxyglucose.

Thus, glycolysis represent a target for therapeutic and diagnostic methods. In the context of the current methods, the measurement of glucose uptake and lactate excretion by malignant cells may be useful to detect shifts in glucose catabolism and/or susceptibility to glucose metabolism inhibitors. Detecting such shifts is important for methods of treating GBM, methods of reducing the risk of ineffective therapy, methods for reducing the chances of tumor survival. For the purposes of this disclosure, $^{18}$F-deoxyglucose PET serves. In embodiments as a rapid non-invasive functional biomarker to predict sensitivity to p53 activation. This non-invasive analysis could be particularly valuable for malignant brain tumors where pharmacokinetic/pharmacodynamics assessment is extremely difficult and impractical. In some cases, delayed imaging protocols (41) and parametric response maps (PRMs) with MRI fusion can be useful for quantifying the changes in tumor $^{18}$F-FDG uptake (42).

In certain aspects, the methods can relate to measuring glucose uptake and lactate production. For cells in culture, glycolytic flux can be quantified by measuring glucose uptake and lactate excretion. Glucose uptake into the cell is through glucose transporters (Glutl-Glut4), whereas lactate excretion is through monocarboxylate transporters (MCT1-MCT4) at the cell membrane.

Extracellular Glucose and Lactate

Methods to detect glucose uptake and lactate excretion include, for example, extracellular glucose or lactate kit, extracellular bioanalyzer, ECAR measurement, [3HJ-2-DG or [14CJ-2-DG uptake $^{18}$FDG uptake or 2-NBDG uptake. Commercially available kits and instruments are available to quantify glucose and lactate levels within cell culture media. Kit detection methods are usually colorimetric or fluorometric and are compatible with standard lab equipment such as spectrophotometers. BioProfile Analyzers (such as Nova Biomedical) or Biochemistry Analyzers (such as for example YSI Life Sciences) can measure levels of both glucose and lactate in cell culture media. GlucCell (Cesco BioProduets) can measure only glucose levels in cell culture media. While each commercial method has a different detection protocol, the collection of culture media for analysis is the same.

Extracellular Acidification Rate

Glycolysis can also be determined through measurements of the extracellular acidification rate (ECAR) of the surrounding media, which is predominately from the excretion of lactic acid per unit time after its conversion from pyruvate. The Seahorse extracellular flux (XF) analyzer (Seahorse Bioscience) is a tool for measuring glycolysis and oxidative phosphorylation (through oxygen consumption) simultaneously in the same cells.

Glucose Analog Uptake

Certain embodiments of the methods of the current disclosure include the use of glucose analogs. As would be familiar to a person skilled in the art, to determine the glucose uptake rate by cells, a labeled Isoform of glucose can be added to the cell culture media and then measured within cells after a given period of time. Exemplary types of glucose analogs for these studies include but are not limited to radioactive glucose analogs, such as 2-deoxy-D-[1,2-3H]-glucose, 2-deoxy-D-[1-14C]-glucose, or 2-deoxy-2-$^{18}$F-fluoro-D-glucose ($^{18}$FDG), or fluorescent glucose analogs, such as 2-[N-(7-nitrobenz-2-oxa-1,3-diaxol-4-yl)amino]-2-deoxyglucose (2-NBDG). Measurements of radioactive glucose analog uptake require a scintillation counter, whereas 2-NBDG uptake is usually measured by flow cytometry or fluorescent microscopy. In some embodiments, the glucose uptake is measured by the uptake of radio-labelled glucose 2-deoxy-2-[fluorine-18]-fluoro-D-glucose ($^{18}$F-FDG). In further embodiments, detecting the $^{18}$F-FDG is by positron emission tomography (PET). In some embodiments, the biopsy is taken from a GBM tumor. A detailed description of an example of measuring $^{18}$F-FDG is provided in the examples below.

In certain aspects, the methods can relate to comparing glucose uptake of a biological sample such as a tumor sample with a control. Fold increases or decreases may be, be at least, or be at most 1-, 2-, 3—, 4-, 5-, 6-, 7-, 8-, 9-, 10-, 11-, 12-, 13-, 14-, 15-, 16-, 17-, 18-, 19-, 20-, 25-, 30-, 35-, 40-, 45-, 50-, 55-, 60-, 65-, 70-, 75-, 80-, 85-, 90-, 95-, 100- or more, or any range derivable therein. Alternatively, differences in expression between a sample and a reference may be expressed as a percent decrease or increase, such as at least or at most 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, 600, 700, 800, 900, 1000% difference, or any range derivable therein.

Other ways to express relative expression levels are with normalized or relative numbers such as 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7. 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6. 1, 6.2, 6.3, 6.4, 6.5, 6.6, 6.7, 6.8, 6.9, 7.0, 7.1, 7.2, 7.3, 7.4, 7.5, 7.6, 7.7, 7.8, 8.0, 8.1, 8.2, 8.3, 8 4, 8.5, 8.6, 8.7, 8 8, 8.9, 9.0, 9.1, 9.2, 9.3, 9.4, 9 5, 9.6, 9.7, 9 8, 9.9, 10.0, or any range derivable therein. In some embodiments, the levels can be relative to a control.

Algorithms, such as the weighted voting programs, can be used to facilitate the evaluation of biomarker level s. In addition, other clinical evidence can be combined with the biomarker-based test to reduce the risk of false evaluations. Other cytogenetic evaluations may be considered in some embodiments.

EXAMPLES

The examples and embodiments described herein are for illustrative purposes only and in some embodiments, various modifications or changes are to be included within the purview of disclosure and scope of the appended claims.

The following abbreviations are used in the Examples below:

| Abbreviation | Full name |
|---|---|
| DCM | dichloromethane |
| DSC | differential scanning calorimetry |
| DVS | dynamic vapor sorption |
| MeOH | methanol |
| PRC | precipitation experiment |
| PXRD | powder X-ray diffraction |
| r.h. | relative humidity |
| r.t. | room temperature (22-25° C.) |
| SLE | slurry experiment/suspension equilibration |
| TBME | tertiary-butyl methyl ether |
| temp. | temperature |
| TG | thermogravimetry |
| TG-FTIR | thermogravimetry coupled to Fourier transform infrared spectroscopy |
| THF | tetrahydrofuran |
| VDi | vapor-in diffusion experiment |
| VDo | vapor out diffusion experiment |

In PXRD peak listings: vs=very strong, s=strong, m=medium, w=weak, and vw=very weak intensity.

DSC: Differential scanning calorimetry was carried out with a TA Instruments Q2000 instrument (sample pan with a pinhole in the lid, heating rate 10 K/min). The melting point is understood as the peak maximum. Because Compound (I) was found to contain about 1.2% water and some of which is released above 100° C., the sample was dried in the DSC sample pan by heating the pan with a pinhole to 100° C. and keeping the sample at this temperature for 10 minutes. Then a second scan was carried out with the dried sample and the first scan is ignored because the endothermic signal could be due to evaporation of water.

Dynamic vapor sorption: DVS measurements were performed with an SPS11-100n "Sorptions Prifsystem" from ProUmid (formerly "Projekt Messtechnik"), August-Nagel-Str. 23, 89079 Ulm (Germany). About 5-20 mg of sample was put into an aluminum sample pan. Humidity change rates of 5% per hour were used. The applied measurement program is visualized in the figure (blue trace). The presentations showing the effective water content are corrected.

The sample was placed on an aluminum or platinum holder on top of a microbalance and allowed to equilibrate at 50% RH before starting the pre-defined humidity programs. The measurement program is visualized in the figures of the report.

Classification of Hygroscopicity: The hygroscopicity was classified based on the mass gain at 85% RH relative to the initial mass as follows: deliquescent (sufficient water adsorbed to form a liquid), very hygroscopic (mass increase of ≥15%), hygroscopic (mass increase <15% but ≥2%), slightly hygroscopic (mass increase <2% but ≥0.2%), or non-hygroscopic (mass increase <0.2%).

Microscopy: Light microscopy was performed on a Leitz Orthoplan polarized microscope part #130880, generally a 10×10 magnification was applied.

H-NMR: Bruker DPX300 spectrometer; proton frequency of 300.13 MHz; 300 excitation pulse; recycle delay of 1 s; accumulation of 16 scans; deuterated DMSO as the solvent; solvent peak used for referencing; chemical shifts reported on the TMS scale.

PowderX-ray diffraction: Powder X-ray diffraction was carried out with a Stoe Stadi P diffractometer equipped with a Mythen1K detector operating with Cu—$K_{\alpha1}$ radiation. The measurements with this instrument were performed in transmission at a tube voltage of 40 kV and 40 mA tube power. A curved Ge monochromator allows testing with Cu—$K_{\alpha1}$ radiation. The following parameters were set: 0.02° 2θ step size, 12 s step time, 1.5-50.5° 2θ scanning range, and 1° 2θ detector step (detector mode in step scan). For a typical sample preparation about 10 mg of sample was placed between two acetate foils and mounted into a Stoe transmission sample holder. The sample was rotated during the measurement. All sample preparation and measurement was done in an ambient air atmosphere.

Raman spectroscopy: FT-Raman spectra were recorded on a Bruker MultiRAM FT-Raman system with a near infrared Nd:YAG laser operating at 1064 nm and a liquid nitrogen-cooled germanium detector. 64 scans with a resolution of 2 $cm^{-1}$ were accumulated in the range from 3500 to −50 $cm^{-1}$; however, only data above 100 $cm^{-1}$ are evaluated due to filter cutoff effects. Nominal laser powers are typically 100 or 300 mW.

Solubility: Approximate solubilities were determined by incremental addition of solvent to about 10 mg the compound. If the substance was not dissolved by addition of a total of at least 10 ml solvent, the solubility is indicated as <1 mg/ml. Due to the experimental error inherent in this method, the solubility values are intended to be regarded as rough estimates and are to be used solely for the design of crystallization experiments.

TG-FTIR: Thermogravimetric measurements were carried out with a Netzsch Thermo-Microbalance TG 209 coupled to a Bruker FTIR Spectrometer Vector 22 (sample pans with a pinhole, $N_2$ atmosphere, heating rate 10 K/min).

HPLC: HPLC was carried out with an Agilent 1100 Series instrument with UV detection and Waters XTerra MS C18, 100×4.6 mm, 5 um, (FK-CC01H) column using the following parameters:

| Mobile Phase | |
| --- | --- |
| Mobile Phase-A | Water + 0.1% TFA |
| Mobile Phase-B | Acetonitrile |
| Flow Rate | 1.00 ml/min |
| Run time | 25.00 min |
| Injection Volume | 10.00 μl |
| Column Oven | 25.0° C. |
| Auto sampler Temperature | 25.0° C. |
| Detector Wavelength | 252 nm |
| Diluent | Methanol |
| Pressure | 77 bar |
| Post run | 4.9 min |

| Gradient Conditions | | |
| --- | --- | --- |
| TIME (min) | A (%) | B (%) |
| 0.00 | 95.0 | 5.0 |
| 20.0 | 5.0 | 95.0 |
| 20.1 | 95.0 | 5.0 |

Example 1

Amorphous Compound (I).

A sample of Compound (I) as obtained through synthesis and purification as described in WO2020/190765 was characterized by various techniques and was determined to be amorphous. The light microscopy image showed glass like particles and the powdered x-ray diffraction (PXRD) pattern displayed no sharp reflections. Thermogravimetry coupled with FT-IR spectroscopy indicated that the sample contained about 1.4% water. Some of the water appeared to be enclosed in void spaces of the amorphous particles and was released above its boiling point. The sample decomposed at temperatures above about 200° C. The differential scanning calorimetry (DSC) thermogram showed a glass transition at about 64° C. with a ΔCp of about 0.44 J/g/° C. Dynamic vapor sorption (DVS) indicated that Compound (I) lost approximately the same amount of water as during the TG-FTIR measurement, i.e., roughly 1.5% while reaching a water content of about 15% at the high r.h. end during the cycles. Therefore, the amorphous form was considered as hygroscopic. The water content at the end of the test was about 6.4% which was significantly higher than at the beginning. Powder X-ray diffraction of the sample recovered post-DVS revealed that the sample has not changed during the DVS experiment.

Approximate solubilities were determined for amorphous Compound (I) at room temperature. These values were obtained by addition of small aliquots of solvent to small amounts of solid to achieve dissolution by stirring or agitation for a short period of time. These values are only approximations and do not necessarily correspond to thermodynamic solubility values. Ratios for solvent mixtures correspond to volume ratios.

Initially the tests were carried out with the amorphous form Compound (I) and later on, after stable crystalline Form D (Example 7 below) was discovered, some of the tests were repeated with the crystalline form. Amorphous Compound (I) is highly soluble in the most common organic solvents such as acetic acid, ketones, alcohols, esters, and dichloromethane and mixtures thereof. Antisolvents are water, heptane, and TBME. The solubility of crystalline Form D was found to be substantially lower than the amorphous form in acetonitrile and ethyl acetate. Based on available data and further experiments diisopropylether, cyclohexane and methylcyclohexane can also be used as antisolvents. The approximate solubility data of crystal Form D and amorphous form of Compound (I) in various solvents is summarized in Table 1.

TABLE 1

| | Approximate solubility (mg/ml) | |
| --- | --- | --- |
| Solvent(s) | Crystalline Form D | Amorphous form |
| Acetic acid/water (1/3) | | S > 130 |
| Acetone | | S > 100 |
| Acetone/heptane 1/3 | S~7 | |
| Acetone/water (1/1) | | S > 120 |
| Acetonitrile | 5 < S < 10 | S > 130 |
| Acetonitrile/water (1/1) | | S > 110 |
| Anisole | | S > 160 |
| Dichloromethane | | S > 100 |
| Ethanol | | S > 100 |
| Ethanol/n-heptane (1/1) | | S > 130 |
| Ethanol/n-heptane (1/3) | S > 107 | S > 130 |
| Ethanol/water (1/1) | | S > 100 |
| Ethyl acetate | | S > 100 |
| Ethyl acetate/n-heptane (1/3) | S~3 | |
| n-Heptane | | S < 1 |
| Isobutylalcohol | S > 136 | |
| Isopropyl acetate | 90 < S < 180 | S~100 |
| MEK | | S > 100 |
| Methanol | | S > 100 |
| Methanol/TBME (1/2) | | S > 140 |
| Propanol, 1-methoxy-2- | S > 200 | |

TABLE 1-continued

| Solvent(s) | Approximate solubility (mg/ml) | |
|---|---|---|
| | Crystalline Form D | Amorphous form |
| Propanol, 2- | | S > 100 |
| Propanol, 2-/heptane 1/1 | S > 20 | |
| TBME | | S~2 |
| THF | | S > 130 |
| THF/n-heptane (1/1) | | S~2 |
| Water | S < 1 | S < 1 |

Example 2

Suspension Equilibration Experiments

Suspension equilibration experiments were run to obtain thermodynamically stable forms (polymorphs or solvates) in a given solvent system. Compound (I) was suspended in an appropriate amount of the designated solvent or solvent mixture. Both amorphous and crystalline Form D were used as the starting materials. In non-aqueous systems crystal Form D was generated from the amorphous form and when Form D was the starting material no new form was produced. In aqueous systems, Form A or Form B were produced. Table 2 provides a summary of suspension equilibration experiments with amorphous form and Form D.

TABLE 2

| Experiment | Conditions | Result |
|---|---|---|
| 1 | Suspension equilibration of amorphous Compound (I) in water - ethanol 2:1 at r.t. | Form B |
| 2 | Suspension equilibration of a mixture of amorphous and Form D in n-butyl acetate - heptane 5:2 at r.t. | Form D |
| 3 | Suspension equilibration of Form D in water at r.t. | Form B |
| 4 | Suspension equilibration of amorphous and crystalline Form D in TBME for five days at r.t. | Form D |
| 5 | Suspension equilibration of amorphous/glassy material in heptane - MIBK 4:1 for three days at r.t. | Form D |
| 6 | Repetition of experiments S278-FD-P20: suspension equilibration of Form D in pure water at r.t. | Form B |
| 7 | Suspension equilibration of Form D in methanol - methyl-cyclohexane 1:4 for two days at r.t. | Form D |
| 8 | Suspension equilibration of Form D in acetonitrile - water 9:1 for two days at r.t. then filtered. | Form A |
| 9 | Suspension equilibration of Compound (I) (amorphous form) triethylamine during one week. | Form D |
| 10 | Suspension equilibration of amorphous Compound (I) in diisopropylether at r.t. | Form D |

Example 3

Evaporation Experiments

Evaporation experiments were carried when crystallization in certain solution experiments failed. Crystallization, in some cases, was achieved when a new (anti-)solvent was added and a suspension equilibration experiment was performed. The results from some of these evaporation experiments are summarized Table 3.

TABLE 3

| Experiment | Conditions | Result |
|---|---|---|
| 1 | Evaporation from a solution of Compound (I) in acetone - heptane 1:3. | Form D |

TABLE 3-continued

| Experiment | Conditions | Result |
|---|---|---|
| 2 | Evaporation from a solution in n-butyl acetate under nitrogen flow at 60° C. | Form D |
| 3 | Evaporation from a solution in methanol - diisopropylether under nitrogen flow at 50° C. | Form D |
| 4 | Evaporation from a solution in ethanol at 50° C. under nitrogen. | Amorphous residue |
| 5 | Attempted crystallization of a solution of Form D in 1-methoxy-2-propanol - heptane 1:2. Since no crystallization could be achieved, the solvents were allowed to evaporate under ambient conditions. | Glassy residue |
| 6 | Attempted crystallization of a solution of Form D in isobutylalcohol - TBME 1:4. Since no crystallization could be achieved, the solvents were allowed to evaporate under ambient conditions. | Glassy residue |

Example 4

Crystal Form A

The first crystalline form of Compound (I) was designated as Form A and was obtained from a suspension equilibration experiment of the amorphous form in an isopropanol—water mixture. Form A was characterized by PXRD, TG-FTIR, H-NMR and DVS. It turned out that highly crystalline samples of Form A typically contained large amounts of solvent and that drying led to significant loss of crystallinity. It is postulated that drying of samples to residual solvent levels below ICH Q3C limits might lead to completely amorphous material.

The PXRD pattern of Form A is depicted in FIG. 1. It should be noted that this sample was examined by PXRD before drying and that the undried sample is highly crystalline in nature. The PXRD pattern shows strong and sharp reflections. A TG-FTIR of the crystal Form A sample without much drying indicated a large mass loss of 36.6% that is attributable to water and isopropanol. Given the large mass loss it was concluded that drying was insufficient, and therefore the sample was further dried under vacuum at ambient temperature for about 23 hours and a new TG-FTIR was recorded. The new TG-FTIR showed a mass loss of about 1.75% and it still contained some water and isopropanol. H-NMR spectroscopy also showed about 0.1 equivalents of isopropanol which would correspond to about 1% and is in good agreement with the TG-FTIR result. A PXRD measurement of the dried sample however showed an essentially amorphous material with the most intense peak barely visible. Table 4 below shows a peak listing for crystal Form A of Compound (I).

TABLE 4

| Angle (°2-theta) | d value [Å] | Intensity | in % |
|---|---|---|---|
| 4.9 | 18.0 | vs | 100 |
| 6.9 | 12.7 | w | 10 |
| 7.8 | 11.4 | w | 6 |
| 9.8 | 9.0 | w | 15 |
| 11.0 | 8.0 | w | 6 |
| 11.4 | 7.7 | w | 7 |
| 12.0 | 7.4 | m | 24 |
| 12.5 | 7.1 | w | 6 |
| 13.4 | 6.6 | w | 5 |
| 13.9 | 6.4 | s | 32 |
| 14.8 | 5.98 | m | 17 |
| 15.1 | 5.86 | w | 7 |

TABLE 4-continued

| Angle (°2-theta) | d value [Å] | Intensity | in % |
|---|---|---|---|
| 15.5 | 5.70 | m | 16 |
| 15.9 | 5.57 | m | 26 |
| 17.0 | 5.20 | w | 7 |
| 17.8 | 4.97 | m | 18 |
| 18.1 | 4.90 | w | 8 |
| 18.4 | 4.81 | w | 14 |
| 18.8 | 4.73 | w | 12 |
| 19.4 | 4.57 | w | 11 |
| 19.8 | 4.48 | w | 6 |
| 20.4 | 4.35 | m | 20 |
| 21.0 | 4.24 | m | 22 |
| 21.3 | 4.18 | w | 5 |
| 22.1 | 4.02 | s | 30 |
| 23.0 | 3.86 | m | 19 |
| 23.3 | 3.81 | w | 14 |
| 23.6 | 3.77 | m | 16 |
| 24.3 | 3.65 | vs | 77 |
| 24.8 | 3.59 | m | 19 |
| 25.1 | 3.54 | s | 38 |
| 25.6 | 3.48 | w | 14 |
| 26.3 | 3.39 | m | 19 |
| 26.8 | 3.33 | w | 10 |
| 27.3 | 3.27 | m | 21 |
| 28.0 | 3.18 | w | 8 |
| 29.2 | 3.06 | vw | 4 |
| 29.9 | 2.99 | w | 12 |
| 30.3 | 2.95 | w | 5 |
| 30.7 | 2.91 | w | 11 |

Form A was could be reliably produced by suspension equilibration in water saturated TBME. TG-FTIR was conducted after keeping Form A in a desiccator at 75% r.h. and the resultant mass loss was 8.9% which is attributable to water and some TBME. This sample was further examined by dynamic water vapor sorption, which indicated that Compound (I) took up just small amounts of water above 50% r.h. while losing about 8% of water below 50% r.h. during the cycles. Small steps were observed between 0% r.h. and 20% r.h. Water was not completely removed during the first DVS cycle at 0% r.h. and this might be the reason that after completion of the DVS test Form A was retained as was demonstrated by PXRD of the post DVS sample.

The water content changes over the whole range of relative humidity; i.e., from 0% to 95% roughly corresponds to three waters per Compound (I) (10%); however, given the poor stability of the hydrate, no fixed stoichiometric ratio was assigned in this case.

Example 5

Crystal Form B

A new crystalline form was obtained from a solution of Compound (I) in ethanol. Powder X-ray diffraction showed that the solid form was slightly different from Form A and was designated as Form B. Form B was characterized by PXRD, TG-FTIR, DVS and H-NMR. Form B was also obtained from methanol—water as the solvent system, and by a suspension equilibration experiment in pure water.

The PXRD pattern of Form B is shown in FIG. 2a and a peak listing is provided in Table 5 below. As with Form A, Form B was examined by PXRD before drying was indicated to be highly crystalline in nature. The PXRD pattern shows strong and sharp reflections. A TG-FTIR was carried out for Form B without further drying and the thermogram indicated a large mass loss of 36.5% that is attributable to water; however no alcohol was detected. Given the large mass loss it was concluded that drying was insufficient, and the sample was subjected to further vacuum drying at ambient temperature for ten minutes and a new TG-FTIR was recorded. The new TG-FTIR thermogram indicated a water content of about 4.6%. An PXRD measurement of the dried sample indicated a dramatic loss of crystallinity and further drying lead to a completely amorphous material.

TABLE 5

| Angle (°2-theta) | d value [Å] | Intensity | in % |
|---|---|---|---|
| 4.8 | 18.2 | vs | 100 |
| 6.9 | 12.8 | w | 9 |
| 9.8 | 9.1 | m | 15 |
| 10.9 | 8.1 | w | 6 |
| 11.9 | 7.4 | w | 12 |
| 13.8 | 6.4 | m | 22 |
| 14.7 | 6.0 | m | 19 |
| 15.4 | 5.73 | w | 14 |
| 16.9 | 5.23 | w | 7 |
| 17.7 | 5.02 | m | 17 |
| 18.3 | 4.84 | w | 10 |
| 19.6 | 4.53 | w | 7 |
| 20.2 | 4.39 | m | 17 |
| 20.8 | 4.27 | w | 13 |
| 21.9 | 4.05 | w | 14 |
| 23.2 | 3.82 | w | 10 |
| 23.5 | 3.78 | w | 11 |
| 24.1 | 3.70 | m | 19 |
| 24.6 | 3.62 | m | 20 |
| 25.1 | 3.55 | m | 15 |
| 25.5 | 3.48 | w | 9 |
| 26.0 | 3.42 | w | 13 |
| 26.5 | 3.36 | w | 10 |
| 27.0 | 3.30 | w | 8 |
| 27.8 | 3.20 | w | 9 |
| 29.6 | 3.02 | w | 9 |
| 30.0 | 2.98 | w | 6 |

Figure 2B:
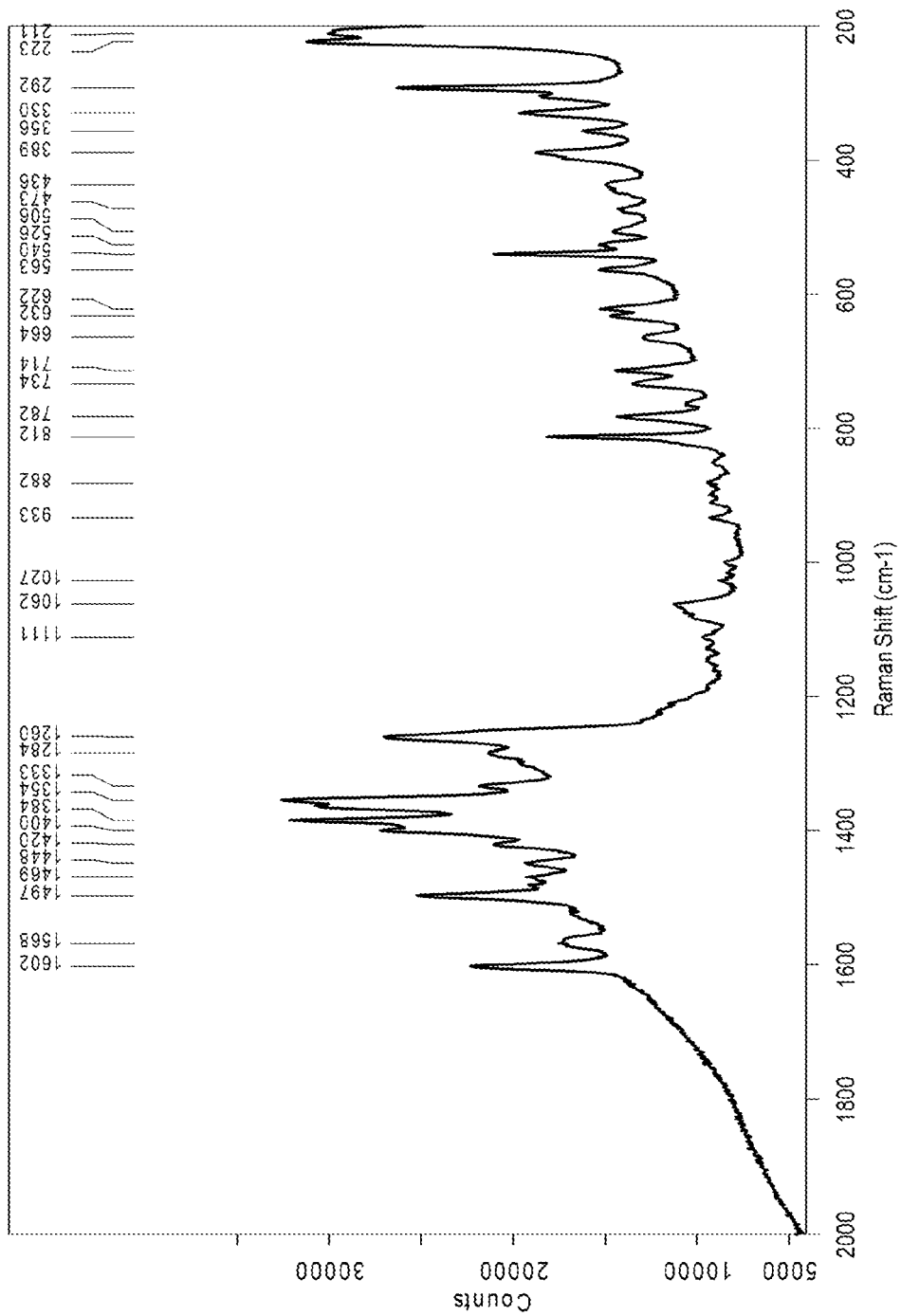
FIG. 2B shows a Fourier transform-Raman spectrum of crystalline Form B of Compound (I)

Form B was examined by dynamic vapor sorption (DVS). As the wet sample was used, there was a large initial mass loss at 50% r.h., i.e., at the beginning of the DVS test. The DVS indicated that once the sample was at 50% r.h., Form B took up just small amounts of water above 50% r.h. The total water content change was about 13% during the cycles. At the end of the DVS test, the sample was recovered from the sample pan and examined by TG-FTIR and PXRD. The PXRD pattern after DVS indicated that crystallinity was lost. The TG-FTIR thermogram indicated the water content was about 6.4%. A Raman spectrum was also obtained and is shown in FIG. 2b.

Example 6

Crystal Form C

Recrystallization] from a solution in acetonitrile—water 5.5:2 followed by equilibration at 5° C. provided a new form, Form C. Form C was characterized by PXRD, TG-FTIR, H-NMR and DVS.

The PXRD pattern of Form C is shown in FIG. 3 and a pick listing provided below in Table 6. As in Forms A and B, Form C was examined by PXRD before drying and indicated that it was highly crystalline in nature. The PXRD pattern shows strong and sharp reflections. A TG-FTIR was carried out without further drying and the thermogram indicated a large mass loss of 48% that is attributable to water. Given the large mass loss it was concluded that drying was insufficient; however, in this case no further drying experiment was carried out.

TABLE 6

| Angle (°2-theta) | d value [Å] | Intensity | in % |
|---|---|---|---|
| 4.9 | 18.1 | vs | 100 |
| 6.9 | 12.7 | w | 9 |
| 9.8 | 9.0 | m | 16 |
| 11.0 | 8.0 | w | 7 |
| 11.5 | 7.7 | w | 7 |
| 11.9 | 7.4 | w | 9 |
| 12.1 | 7.3 | m | 16 |
| 13.0 | 6.8 | w | 11 |
| 13.2 | 6.7 | w | 8 |
| 13.7 | 6.5 | w | 13 |
| 13.9 | 6.4 | w | 8 |
| 14.1 | 6.3 | w | 9 |
| 14.4 | 6.1 | m | 16 |
| 14.7 | 6.0 | m | 21 |
| 14.9 | 5.94 | w | 11 |
| 15.5 | 5.72 | w | 8 |
| 15.8 | 5.61 | w | 12 |
| 16.2 | 5.48 | w | 11 |
| 16.7 | 5.30 | w | 7 |
| 17.0 | 5.21 | w | 11 |
| 17.4 | 5.08 | w | 10 |
| 17.8 | 4.98 | w | 13 |
| 18.1 | 4.91 | w | 7 |
| 18.5 | 4.78 | w | 8 |
| 19.0 | 4.66 | w | 7 |
| 19.4 | 4.57 | w | 10 |
| 19.6 | 4.53 | w | 10 |
| 20.2 | 4.39 | m | 19 |
| 20.5 | 4.32 | w | 11 |
| 21.0 | 4.24 | w | 8 |
| 21.3 | 4.16 | w | 10 |
| 21.8 | 4.07 | w | 10 |
| 22.1 | 4.03 | w | 9 |
| 22.5 | 3.94 | w | 11 |
| 22.9 | 3.89 | s | 36 |
| 23.2 | 3.83 | m | 22 |
| 23.7 | 3.76 | m | 30 |
| 24.0 | 3.70 | w | 13 |
| 24.3 | 3.66 | m | 27 |
| 24.6 | 3.61 | m | 21 |
| 24.9 | 3.57 | w | 10 |
| 25.1 | 3.54 | w | 10 |
| 25.4 | 3.51 | w | 10 |
| 25.7 | 3.46 | w | 12 |
| 26.1 | 3.42 | m | 18 |
| 26.4 | 3.38 | w | 13 |
| 26.6 | 3.35 | w | 8 |
| 26.9 | 3.31 | w | 8 |
| 27.1 | 3.29 | w | 9 |
| 27.3 | 3.26 | w | 10 |
| 27.6 | 3.23 | w | 7 |
| 28.1 | 3.17 | w | 9 |
| 28.5 | 3.13 | w | 7 |
| 28.9 | 3.08 | w | 8 |
| 29.2 | 3.05 | w | 9 |

The DVS result for Form C was similar to the results for Forms A and B. As the wet sample was used, there was a large initial mass loss at 50% r.h., i.e., at the beginning of the DVS test. The dynamic water vapor sorption indicated that when the sample was lightly dried (i.e., dried at 50% r.h.), it took up just small amounts of water above 50% r.h. The total water content change was about 14% during the cycles and the water content at the end was about 5.9%, while a completely dry material was not achieved at 0% r.h. (i.e., under nitrogen for five hours). At the end of the DVS test the sample was recovered from the sample pan and examined by TG-FTIR and PXRD. The PXRD after DVS indicated that crystallinity was lost almost completely. The TG-FTIR thermogram indicated a water content of about 5.9%.

Example 7

Crystal Form D

During the polymorphism study which was conducted in batches, amorphous samples were obtained frequently. The crystalline forms A, B, and C that were discovered showed poor physical form stability. During salt scale-up experiments a new crystalline form of the free base was discovered when starting with a new batch. Based upon approximate solubility data, amorphous Compound (I) had a high solubility in ethyl acetate. When attempting to obtain a mesylate salt from a solution of free base in ethyl acetate by adding methanesulfonic acid, a suspension formed before the acid was added. The solid product isolated from the suspension was crystalline and showed a new PXRD pattern. This new crystalline form of the free base was designated as Form D and was further characterized by chemical purity by HPLC, FT-Raman, TG-FTIR, DSC, DVS, and solubility in pure water and in various buffer solutions. Form D is a non-solvated form and is best produced with water-free solvents and solvent mixtures. Solubility tests were also conducted in possible process solvent mixtures.

Form D was generally obtained from crystallization experiments from solutions listed in Table 7. These experiments were often combined with phase equilibration; i.e., the obtained suspensions were not immediately filtered. Because it was considered as important to find a stable form, the suspensions were stirred for several days.

TABLE 7

| Experiment | Conditions | Result |
|---|---|---|
| 1 | Crystallization of amorphous sample from ethyl acetate at room temperature (r.t.), then slurried for two days. | Form D |
| 2 | Crystallization of amorphous sample from ethyl acetate after seeding at r.t. | Form D |
| 3 | Crystallization of amorphous sample from acetonitrile at r.t., then slurried for two days. | Form D |
| 4 | Attempted crystallization of amorphous sample from isopropanol heptane 1:2. | No solid product. |
| 5 | Crystallization of amorphous sample from isopropyl acetate - cyclohexane 1:2 followed by four days equilibration in suspension at r.t. | Form D |
| 6 | Crystallization of amorphous sample from MEK - diisopropylether followed by four days suspension equilibration at r.t. | Form D |
| 7 | Attempted crystallization of amorphous sample by suspension in TBME saturated with water in combination with ethyl acetate and heating to 50° C. for several hours. | No solid product. |
| 8 | Crystallization of amorphous sample from MEK - p-xylene 1:2 in combination with partial evaporation of solvents and suspension equilibration over two weeks. | Form D |
| 9 | Crystallization of amorphous sample from DCM - heptane 1:3 followed by five days equilibration. | Form D |
| 10 | Crystallization of amorphous sample from ethyl acetate at r.t., then slurried for six days. | Form D |
| 11 | Crystallization of amorphous sample from methyl-THF - methylcyclohexane 1:2 followed by four days equilibration at r.t | Form D |
| 12 | Crystallization of amorphous sample from isopropyl acetate - heptane 2:3 followed by two days equilibration. | Form D |
| 13 | Crystallization of amorphous sample from isopropanol - water 1:1 followed by five days equilibration. | Form A |
| 14 | Crystallization of amorphous sample from isopropyl acetate - heptane 1:1 followed by five days equilibration. | Form D |

A powder X-ray diffraction pattern of Compound (I) (free base) Form D is shown in FIG. 4a and a peak listing is provided in Table 8 below.

TABLE 8

| Angle (°2-theta) | d value [Å] | Intensity | in % |
|---|---|---|---|
| 6.7 | 13.3 | w | 13 |
| 9.7 | 9.1 | w | 12 |
| 10.2 | 8.7 | m | 26 |
| 10.4 | 8.5 | w | 12 |
| 13.5 | 6.6 | m | 17 |
| 13.7 | 6.4 | w | 11 |
| 14.1 | 6.3 | w | 10 |
| 14.7 | 6.02 | w | 11 |
| 15.2 | 5.81 | s | 58 |
| 15.6 | 5.66 | vs | 73 |
| 15.9 | 5.56 | m | 16 |
| 16.1 | 5.49 | w | 13 |
| 16.9 | 5.23 | vs | 81 |
| 18.5 | 4.80 | w | 10 |
| 19.1 | 4.65 | vs | 99 |
| 19.5 | 4.54 | vs | 99 |
| 19.8 | 4.47 | w | 12 |
| 20.1 | 4.41 | w | 11 |
| 20.4 | 4.35 | w | 8 |
| 20.9 | 4.26 | w | 8 |
| 21.4 | 4.16 | w | 12 |
| 21.6 | 4.11 | w | 12 |
| 22.5 | 3.95 | vs | 100 |
| 23.3 | 3.81 | m | 21 |
| 24.3 | 3.66 | m | 20 |
| 24.7 | 3.60 | m | 21 |
| 24.9 | 3.57 | m | 28 |
| 25.2 | 3.53 | w | 12 |
| 26.0 | 3.43 | vs | 84 |
| 26.4 | 3.38 | w | 12 |
| 27.2 | 3.28 | w | 11 |
| 27.6 | 3.22 | w | 14 |
| 27.9 | 3.20 | m | 17 |
| 28.1 | 3.17 | w | 7 |
| 28.4 | 3.14 | w | 7 |
| 28.8 | 3.10 | w | 8 |
| 29.6 | 3.02 | m | 16 |
| 29.9 | 2.99 | w | 9 |

Figure 4B:
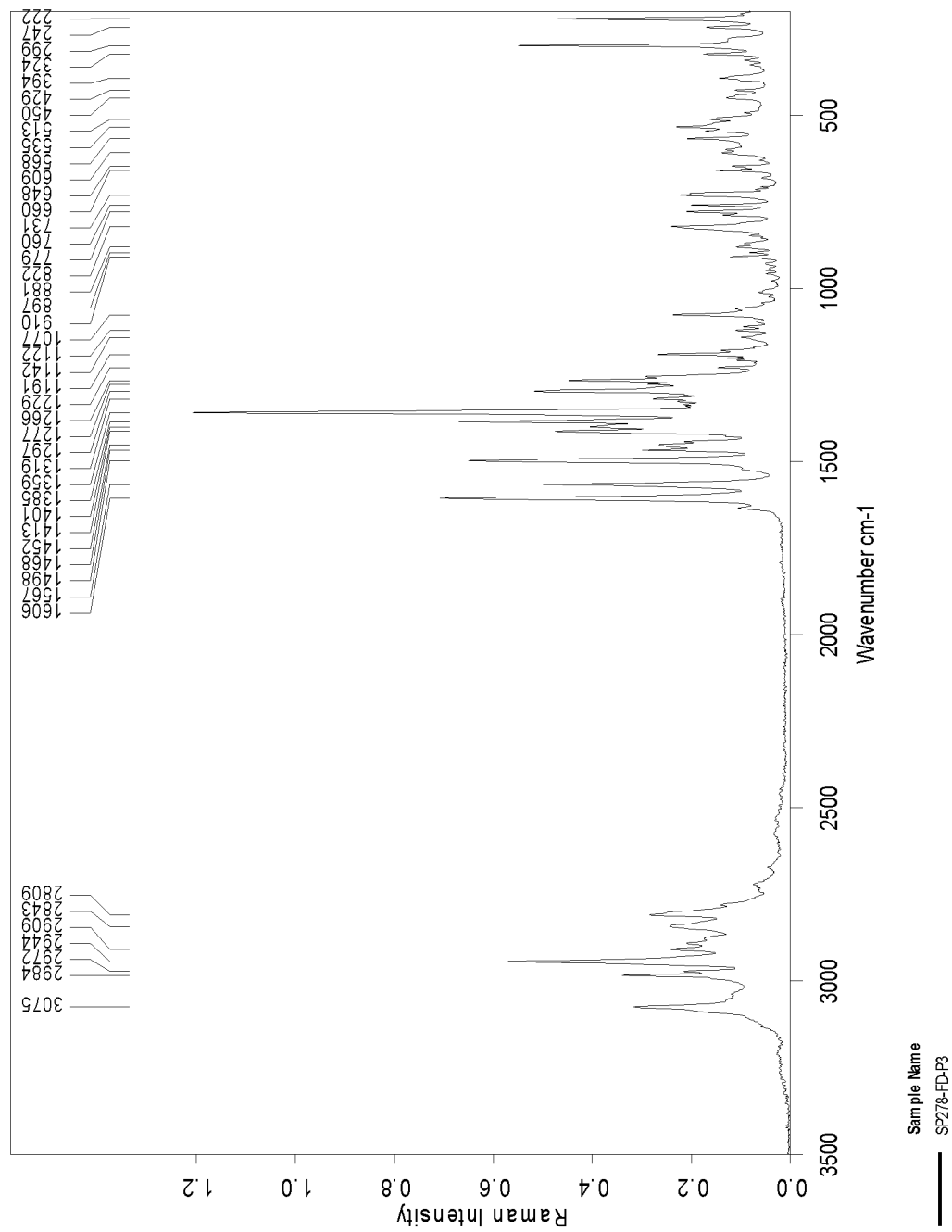
FIG. 4B shows a Fourier transform-Raman spectrum of crystalline Form D of Compound (I).

The purity for the new Form D was examined by a generic standard HPLC method. The purity was found to be 99.4% (vs. 98.1% of the amorphous starting material). A fourier transform (FT)-Raman spectrum of Form D is shown in FIG. 4b.

A TG-FTIR thermogram was recorded for Form D, which indicated it was a solvent-free form as it showed only about 0.3% of residual ethyl acetate despite the fact that the sample was tested after short drying in air at ambient temperature. DSC revealed a fairly sharp melting endotherm with a peak maximum at 153° C. and an enthalpy signal of about 69 J/g.

Solubility tests were conducted in potential process solvent mixtures with Form D. The results are shown in Table 9 below.

TABLE 9

| Solvent mixture | Solubility at 25° C. |
|---|---|
| Isopropanol - water 1:1 | 20.3 mg/ml |
| Isopropanol - water 1:3 | 1.2 mg/ml |
| Ethyl acetate - heptane 1:1 | 23.1 mg/ml |
| Ethyl acetate - heptane 1:3 | 6.3 mg/ml |

DVS was carried out on Form D. At 95% relative humidity, Form D takes up to 0.8% of water and the sample lost all its water when the humidity is scanned back to 0% r.h.

Aqueous solubility was tested on amorphous and Form D of Compound I. The results are shown in Table 10 below.

TABLE 10

| Form | Equilibration time | pH | Solubility |
|---|---|---|---|
| Amorphous | One hour | 9.16 | 0.046 mg/ml |
| Amorphous | 24 hours | 9.27 | 0.049 mg/ml |
| Form D | 24 hours | 8.49 | 0.066 mg/ml | pH dependent solubility tests were conducted in 0.1 M HCl, in citrate buffer, and in USP phosphate buffers with nominal pH values of 6.8 and 7.4. Solubility tests at pH values below 5 failed because all compounds dissolved during the equilibration phase. An approximate test showed that 55 mg of compound easily dissolve in 1.0 ml of 0.1M HCl. The results are summarized in Table 11 below.

TABLE 11

| Form | Effective pH | Solubility |
|---|---|---|
| Amorphous | 6.25 | 9.63 mg/ml |
| Amorphous | 6.95 | 0.316 mg/ml |
| Amorphous | 7.50 | 0.094 mg/ml |
| Form D | 5.28 | 13.1 mg/ml |
| Form D | 6.11 | 6.6 mg/ml |
| Form D | 6.97 | 0.21 mg/ml |
| Form D | 7.47 | 0.084 mg/ml |

All documents mentioned herein are herein incorporated by reference herein in their entirety.

What is claimed is:

1. A polymorph of Compound (I):

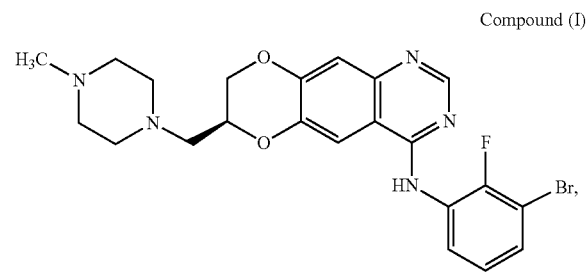 [SMILES: CN1CCN(C[C@H]2COc3cc4ncnc(Nc5cccc(Br)c5F)c4cc3O2)CC1]

Compound (I)

wherein the polymorph is Form D; and
wherein the polymorph is characterized by an X-ray powder diffraction pattern comprising characteristic peaks expressed in values (°2θ) at 15.6°±0.2°2θ, 16.9°±0.2°±2θ, 19.1°±0.2°±2θ, 19.5°±0.2°±2θ, 22.5°±0.2°2θ, and 26.0°±0.2°2θ.

2. The polymorph of claim 1, wherein the polymorph is further characterized by an X-ray powder diffraction pattern comprising a characteristic peak expressed in a value (°2θ) at 15.2°±0.2°2θ.

3. The polymorph of claim 1, wherein the polymorph is further characterized by an X-ray powder diffraction pattern comprising characteristic peaks expressed in values (°2θ) at 10.2°±0.2°2θ, 13.5°±0.2°2θ, 15.9°±0.2°2θ, 23.3°±0.2°2θ, 24.3°±0.2°2θ, 24.7°±0.2°2θ, 24.9°±0.2°2θ, 27.9°±0.2°2θ, and 29.6°±0.2°2θ.

4. The polymorph of claim 1, wherein the polymorph is further characterized by a melting point of 153° C.

5. A pharmaceutical composition comprising a pharmaceutically acceptable excipient and the polymorph of Compound (I) of claim 1.

6. A method for treating cancer in a subject in need thereof, wherein the method comprises administering to the subject a therapeutically effective amount of the polymorph of Compound (I) of claim 1.

7. The method of claim 6, wherein the cancer is characterized by aberrant epidermal growth factor receptor (EGFR) expression.

8. The method of claim 6, wherein the cancer is brain cancer.

9. A process for preparing the polymorph of Compound (I) of claim 1:

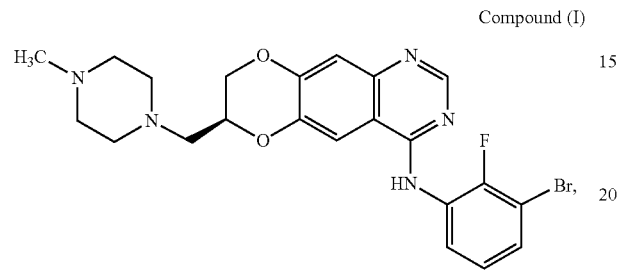

Compound (I)

wherein the polymorph is Form D; and
wherein the polymorph is characterized by an X-ray powder diffraction pattern comprising characteristic peaks expressed in values (°2θ) at 15.6°±0.2°2θ, 16.9°±0.2°2θ, 19.1°±0.2°2θ, 19.5°±0.2°2θ, 22.50°±0.202θ, and 26.0°±0.2°2θ;
wherein the process comprises:
evaporating a solution of an amorphous form of Compound (I):

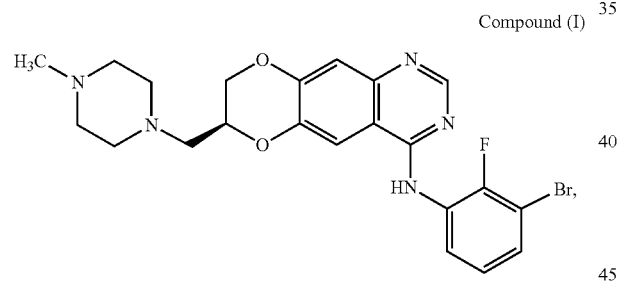

Compound (I)

wherein a solvent of the solution is selected from the group consisting of (a), (b), and (c):
(a) acetone:heptane (1:3);
(b) n-butyl acetate; and
(c) methanol:diisopropyl ether (1:12).

10. A process for preparing the polymorph of Compound (I) of claim 1:

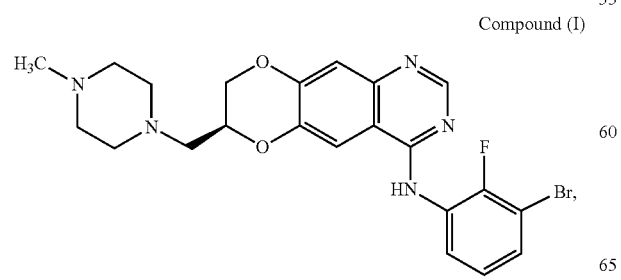

Compound (I)

wherein the polymorph is Form D; and
wherein the polymorph is characterized by an X-ray powder diffraction pattern comprising characteristic peaks expressed in values (°2θ) at 15.6°±0.2°2θ, 16.9°±0.2°2θ, 19.1°±0.2°2θ, 19.5°±0.2°2θ, 22.5°±0.2°2θ, and 26.0°±0.2°2θ;
wherein the process comprises:
crystallizing an amorphous form of Compound (I):

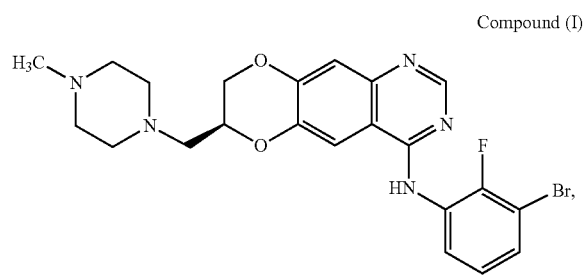 [SMILES: CN1CCN(C[C@H]2COc3cc4ncnc(Nc5cccc(Br)c5F)c4cc3O2)CC1]

Compound (I)

in a nonaqueous solvent system via a technique selected from the group consisting of equilibrating, seeding, and slurrying, or a combination thereof, to convert the amorphous form of Compound (I) to polymorph Form D of Compound (I).

11. The process of claim 10, wherein the crystallizing further comprises an equilibrating, a seeding, or a slurrying technique selected from the group consisting of (a), (b), (c), (d), (e), and (f):
(a) equilibrating in isopropyl acetate:heptane (1:1);
(b) equilibrating in isopropyl acetate:heptane (2:3);
(c) equilibrating in methyl tetrahydrofuran (THF):methyl cyclohexane (1:2);
(d) seeding with Form D in ethyl acetate;
(e) slurrying in acetonitrile; and
(f) slurrying in ethyl acetate.

12. The process of claim 10, wherein the equilibrating is suspension equilibrating.

13. The process of claim 12, wherein the suspension equilibrating further comprises a suspension equilibrating technique selected from the group consisting of (a), (b), (c), (d), (e), (f), (g), (h), and (i):
(a) suspension equilibrating in n-butyl acetate:heptane (5:2);
(b) suspension equilibrating in tert-butyl methyl ether (TBME) with seeding with Form D;
(c) suspension equilibrating in heptane:methyl isobutyl ketone (MIBK) (4:1);
(d) suspension equilibrating in isopropyl acetate:cyclohexane (1:2);
(e) suspension equilibrating in diisopropyl ether;
(f) suspension equilibrating in methanol:methyl cyclohexane (1:4);
(g) suspension equilibrating in methyl ethyl ketone (MEK):diisopropyl ether;
(h) suspension equilibrating in methyl ethyl ketone (MVEK):p-xylene (1:2) and partial evaporation of solvent; and
(i) suspension equilibrating in trimethylamine.

* * * * *